(12) United States Patent
Johnson, Jr. et al.

(10) Patent No.: US 10,886,765 B2
(45) Date of Patent: Jan. 5, 2021

(54) LIGHTED CONNECTOR FOR A BATTERY CABLE

(71) Applicant: Johnson Industries, Inc., Pikeville, KY (US)

(72) Inventors: George F. Johnson, Jr., Pikeville, KY (US); Mark A DiLuciano, Kingsport, TN (US)

(73) Assignee: Johnson Industries, Inc., Pikeville, KY (US)

( * ) Notice: Subject to any disclaimer, the term of this patent is extended or adjusted under 35 U.S.C. 154(b) by 118 days.

(21) Appl. No.: 16/229,635

(22) Filed: Dec. 21, 2018

(65) Prior Publication Data

US 2019/0115763 A1 Apr. 18, 2019

Related U.S. Application Data

(63) Continuation-in-part of application No. 15/725,354, filed on Oct. 5, 2017, now Pat. No. 10,177,589, which
(Continued)

(51) Int. Cl.
*H02J 7/00* (2006.01)
*H02J 7/35* (2006.01)
(Continued)

(52) U.S. Cl.
CPC .............. *H02J 7/007* (2013.01); *H01R 11/24* (2013.01); *H02J 7/0047* (2013.01);
(Continued)

(58) Field of Classification Search
CPC ........ H02J 7/007; H02J 7/0069; H02J 7/0071; H02J 7/0068; H02J 7/0047; H02J 7/0048;
(Continued)

(56) References Cited

U.S. PATENT DOCUMENTS

| 4,755,733 A | 7/1988 | Laliberte |
| 4,776,585 A * | 10/1988 | Maleyko .................. A63B 5/20 |
| | | 482/82 |

(Continued)

FOREIGN PATENT DOCUMENTS

| EP | 1903658 A2 * | 3/2008 | ............ H02J 7/0047 |
| JP | H06-54451 A | 2/1994 | |
| WO | WO 90/03682 A1 | 4/1990 | |

OTHER PUBLICATIONS

"8 Gauge Jumper Cables with LED Lights 12 Foot Booster Cables," Illinois Industrial Tool, Aug 12, 2014, downloaded from https://www.amazon.com/Gauge-Jumper-Cables-Lights-Booster/dp/B00MRAVVTK, 5 pgs.

(Continued)

*Primary Examiner* — M Baye Diao
(74) *Attorney, Agent, or Firm* — Frost Brown Todd LLC

(57) ABSTRACT

The disclosure relates to a lighted connector configured to be attached to a rechargeable battery to allow the rechargeable battery to charged and/or discharged. The lighted connector includes a light that is operably connected to a control unit and/or processing component. The control unit and/or processing component may be programmed to control operation of the light in accordance with various parameters. In some embodiments, the light may be configured to be illuminated in response to an illumination triggering event, such as the lighted connector transitioning from a closed position toward an open position or a battery maintenance device associated with the lighted connector being connected to a power source. In addition, the lighted connector may be configured to be turned off in response to a shut-off triggering event, such as the lighted connector being correctly attached to a rechargeable battery. Furthermore, the light may be used in various ways to provide feedback to the user.

18 Claims, 24 Drawing Sheets

Related U.S. Application Data is a continuation-in-part of application No. 15/625,298, filed on Jun. 16, 2017, now Pat. No. 9,917,465, which is a continuation of application No. 15/346,007, filed on Nov. 8, 2016, now Pat. No. 9,705,351.

(60) Provisional application No. 62/285,777, filed on Nov. 9, 2015, provisional application No. 62/732,794, filed on Sep. 18, 2018.

(51) Int. Cl.
  *H02J 7/34* (2006.01)
  *H01R 11/24* (2006.01)

(52) U.S. Cl.
  CPC .......... *H02J 7/0068* (2013.01); *H02J 7/0069* (2020.01); *H02J 7/0071* (2020.01); *H02J 7/0048* (2020.01); *H02J 7/0049* (2020.01); *H02J 7/345* (2013.01); *H02J 7/35* (2013.01)

(58) Field of Classification Search
  CPC .. H02J 7/0049; H02J 7/345; H02J 7/35; H02J 2300/28; Y02E 10/766; H01R 11/24
  USPC ........................................................ 320/133
  See application file for complete search history.

(56) References Cited

U.S. PATENT DOCUMENTS

| | | | | |
|---|---|---|---|---|
| 4,840,583 | A * | 6/1989 | Moore | H01R 11/24 439/504 |
| 4,902,955 | A * | 2/1990 | Manis | H02J 7/0042 320/105 |
| 4,938,712 | A * | 7/1990 | Black | H01R 11/24 320/105 |
| 4,983,473 | A * | 1/1991 | Smith | B60R 16/04 429/121 |
| 5,151,644 | A | 9/1992 | Pearson et al. | |
| 5,196,779 | A | 3/1993 | Alexandres et al. | |
| 5,331,268 | A | 7/1994 | Patino et al. | |
| 5,350,995 | A | 9/1994 | Iketani | |
| 5,449,997 | A | 9/1995 | Gilmore et al. | |
| 5,475,294 | A | 12/1995 | Isoda | |
| 5,481,174 | A | 1/1996 | Martin et al. | |
| 5,514,946 | A | 5/1996 | Lin et al. | |
| 5,599,204 | A * | 2/1997 | Glassford | H01R 31/06 439/502 |
| 5,608,306 | A | 3/1997 | Rybeck et al. | |
| 5,635,815 | A | 6/1997 | Whitchurch et al. | |
| 5,710,506 | A | 1/1998 | Broell et al. | |
| 5,747,970 | A | 5/1998 | Johnson, Jr. et al. | |
| 5,754,029 | A | 5/1998 | Mann et al. | |
| 5,767,659 | A | 6/1998 | Farley | |
| 6,091,227 | A | 7/2000 | Beard | |
| 6,254,426 | B1 * | 7/2001 | Iacovelli | H01R 11/24 439/504 |
| 6,388,425 | B1 | 5/2002 | Petrovic | |
| 6,462,514 | B2 | 10/2002 | Maloizel | |
| 6,764,347 | B1 * | 7/2004 | Plishner | H01R 13/7175 439/668 |
| 6,771,042 | B2 | 8/2004 | Chen et al. | |
| 6,896,544 | B1 * | 5/2005 | Kuelbs | H01R 11/24 439/504 |
| 6,994,560 | B2 * | 2/2006 | Kohchi | H01R 13/7036 439/43 |
| 6,999,062 | B2 * | 2/2006 | Hara | G06F 3/0202 345/158 |
| 7,282,891 | B2 | 10/2007 | Smallwood et al. | |
| 7,710,072 | B2 | 5/2010 | Ibrahim | |
| 7,710,266 | B2 * | 5/2010 | Belden, Jr. | G08B 13/1454 340/568.3 |
| 7,789,523 | B2 * | 9/2010 | Arnold, III | F21L 4/085 362/183 |
| 8,047,671 | B2 * | 11/2011 | Fan | F21L 4/00 362/119 |
| 8,164,468 | B2 | 4/2012 | Gofman et al. | |
| 8,608,513 | B2 * | 12/2013 | Lee | F21V 23/06 439/668 |
| 8,901,877 | B2 * | 12/2014 | Brockman | H01M 10/46 320/105 |
| 9,204,519 | B2 * | 12/2015 | Gan | H05B 47/10 |
| 9,420,661 | B2 * | 8/2016 | Martzall | F21V 31/005 |
| 9,705,351 | B2 | 7/2017 | Johnson, Jr. et al. | |
| 9,917,465 | B2 | 3/2018 | Johnson, Jr. et al. | |
| 10,177,589 | B2 | 1/2019 | Johnson, Jr. et al. | |
| 10,326,245 | B1 * | 6/2019 | Parekh | H04B 3/00 |
| 2002/0021108 | A1 | 2/2002 | Suzuki et al. | |
| 2004/0132344 | A1 * | 7/2004 | Plishner | H01R 13/717 439/668 |
| 2005/0225299 | A1 | 10/2005 | Petrovic | |
| 2005/0248313 | A1 | 11/2005 | Thorland | |
| 2005/0284740 | A1 * | 12/2005 | Nagai | B60Q 3/80 200/310 |
| 2009/0195162 | A1 * | 8/2009 | Maurer | H05B 47/19 315/87 |
| 2009/0207598 | A1 * | 8/2009 | Frick | F21V 23/0414 362/183 |
| 2011/0269336 | A1 * | 11/2011 | Nashimoto | F21V 21/145 439/504 |
| 2013/0099738 | A1 * | 4/2013 | Brockman | H01M 10/46 320/109 |
| 2017/0302105 | A1 | 10/2017 | Toyoda et al. | |
| 2018/0034287 | A1 | 2/2018 | Johnson, Jr. et al. | |

OTHER PUBLICATIONS

"Battery Desulfator, Battery Reconditioner: Restore and Maintian Your Battery in Top Condition," Sakura Batteries UK, Mar. 24, 2015, downloaded from http://web.archive.org/web/20150324015243/ http://www.recovermybatteries.com/, Nov. 11, 2016, 2 pgs.

"Battery Recovery, Reconditioning Desulfation and Maintenance . . . Made Easy! Battery Reconditioner, Battery Desulfator, Battery Rejuvenator Restore or Maintain Your Lead Acid Batteries in Top Condition," Battery Extra, Corby Northants, UK, Mar. 30, 2016, downloaded from http://recovermybatteries.com/index.html, Nov. 11, 2016, 31 pgs.

Haridy, R., "EV battery life extended by feeding energy back into the grid," University of Warwick, Jun. 15, 2017, downloaded from http://newatlas.com/ev-battery-power-buildings-extend-longevity/50070/, 4 pgs.

"Lead-acid battery," Wikipedia, modified May 30, 2015, downloaded from http://web.archive.org/web/20150603091321/http://en.m.wikipedia.org/wiki/Lead%E2%80%93acid_battery, Nov. 11, 2016, 19 pgs.

"Lee Hart's Battery Charging Basics," VDL Electric Vehicle Discussion List, Dec. 6, 2011, downloaded from http://www.evdl.org/pages/hartcharge.html , Nov. 11, 2016, 3 pgs.

"Rally Marine Grade 10 Gauge Jumper Cables with LED light (7339)," Rally, Apr. 1, 2011, downloaded from https://www.amazon.com/Rally-Marine-Grade-Jumper-Cables/dp/B004UR16DY, 5 pgs.

"Storage Battery Maintenance and Principles," Facilities Instructions, Standards, and Techniques, vol. 3-6, p. 13, Internet Version created Jun. 1998, Hydroelectric Research and Technical Services Group, US Dept. of the Interior, Bureau of Reclamation, Denver, Colorado, 83 pgs.

International Search Report and Written Opinion dated Mar. 3, 2017 for Application No. PCT/US2016/060937, 13 pgs.

U.S. Appl. No. 62/285,777, filed Nov. 9, 2015.

U.S. Appl. No. 62/732,794, filed Sep. 18, 2018.

International Search Report and Written Opinion dated Jan. 17, 2020 for International Application No. PCT/US2019/051503, 19 pages.

* cited by examiner

LIGHTED CONNECTOR FOR A BATTERY CABLE

PRIORITY

This application claims priority to U.S. Provisional Patent Application Ser. No. 62/732,794, filed on Sep. 18, 2018, entitled BATTERY CHARGER AND BATTERY EXERCISING DEVICE AND RELATED FEATURES, METHODS AND DEVICES," and is a continuation-in-part of U.S. Nonprovisional patent application Ser. No. 15/725,354, filed Oct. 5, 2017, entitled "BATTERY EXERCISING DEVICE", which is a continuation-in-part of U.S. Nonprovisional patent application Ser. No. 15/625,298, filed Jun. 16, 2017, entitled "BATTERY EXERCISING DEVICE", and issued as U.S. Pat. No. 9,917,465 on Mar. 13, 2018, which is a continuation of U.S. Nonprovisional patent application Ser. No. 15/346,007, filed Nov. 8, 2016, entitled "BATTERY EXERCISING DEVICE", and issued as U.S. Pat. No. 9,705,351 on Jul. 11, 2017, which claims priority to U.S. Provisional Patent Application Ser. No. 62/285,777, filed Nov. 9, 2015, entitled "AUTOMATIC TIMED BATTERY CHARGE/DISCHARGE EVENT CONTROLLER", the disclosures of which are incorporated by reference herein.

BACKGROUND

In some commercial and residential situations, rechargeable batteries such as those used in golf carts, boats, mining machinery, or other devices may sit unused for an extended period of time. As such, the battery may slowly drain, lose its charge, and be unable to provide power when the need eventually arises. In an effort to maintain a continuous full charge in the battery, some battery chargers provide a float charge after the battery is fully charged to continuously "top off" the battery charge. However, the required float charge is directly dependent on the temperature of the battery and thus needs to dynamically change to account for changes in the temperature of the battery. For example, the required float charge at night can be different from the required float charge during the day due to daily temperature differences. Therefore, some of these types of battery chargers require internal logic and temperature sensing components to constantly maintain a proper charge in the underlying battery. Further, some of these types of battery chargers require constant power from an outside source to continuously apply a float charge to the battery. However, when a power outage occurs, the battery can begin to discharge naturally and lose voltage. Oftentimes the battery may have only partially discharged when the power returns and the battery begins recharging.

While a variety of battery chargers have been made and used, it is believed that no one prior to the inventors have made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
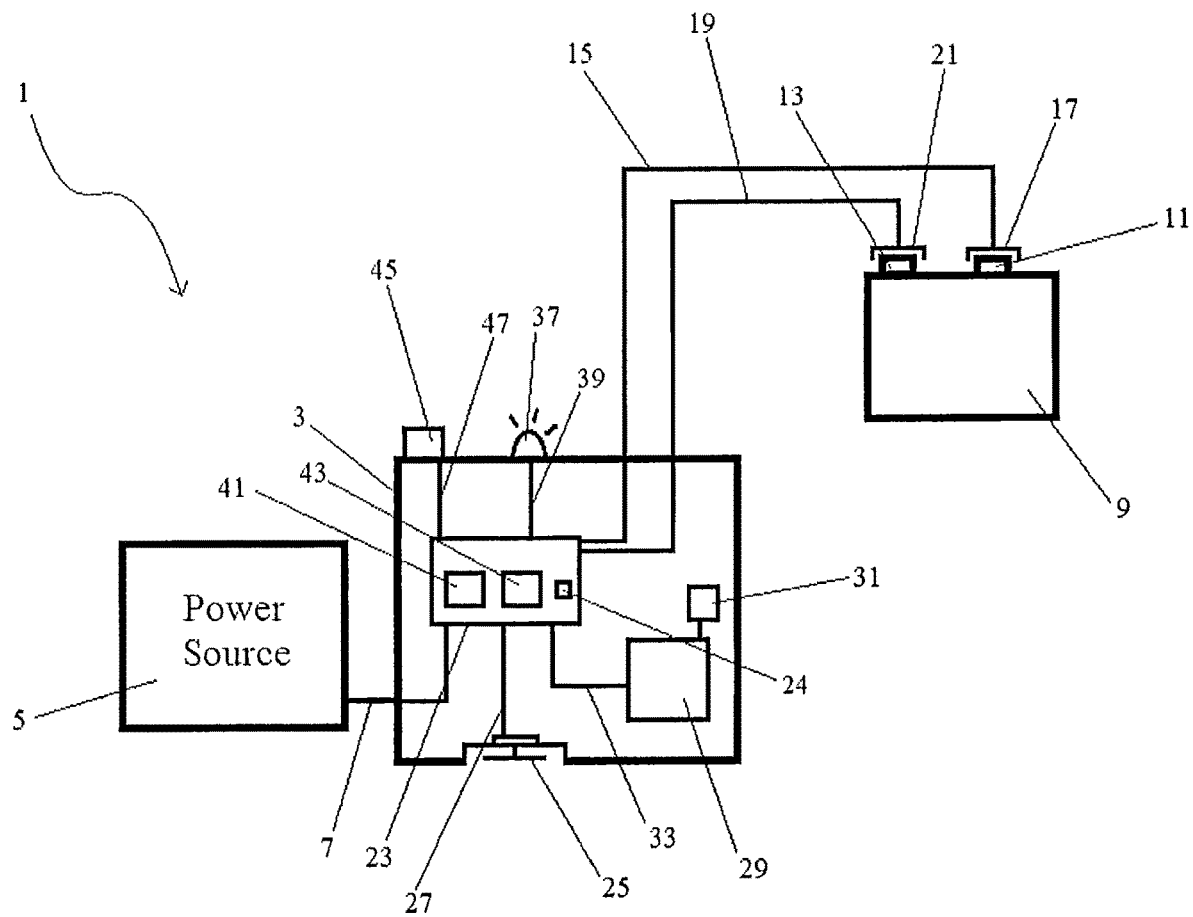
FIG. 1 depicts a diagrammatical view of an exemplary battery exercising device.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. BATTERY EXERCISING DEVICE

FIG. 1 depicts an embodiment of a device configured to periodically charge and discharge a battery, referred to herein after as battery exercising device (1). Battery exercising device (1) includes a housing (3) which provides a protective outer shell and may include features such as handles (not shown) or feet (not shown). Outer shell may be rigid and may feature any rigid nonflammable materials, including but not limited to steel or aluminum. Battery exercising device (1) is configured to receive power from a power source (5), including but not limited to conventional electrical outlets and renewable power sources such as solar panels and wind turbines. Power (i.e., electricity) from power source (5) is supplied through a power cord (7) or a similar wiring arrangement. Power cord (7) may be integrated with housing (3) or may be detachable from housing (3). Power source (5) may be a wall outlet or another mechanical structure for coupling with power cord (7) and delivering electrical power to battery exercising device (1).

Battery exercising device (1) is configured to recharge a battery (9), such as a lead-acid battery, referred to hereinafter as rechargeable battery (9) or battery (9). In the illustrated embodiment, rechargeable battery (9) includes a positive terminal (11), a negative terminal (13), and internal elements well known in the art for providing battery generated electrical current through terminals (11, 13) as needed or for receiving electrical input to charge battery (9). A positive wire (15) extends from housing (3) at a proximal end and includes a positive lead (17) at the distal end. Positive lead (17) is configured to electrically couple with positive terminal (11) and may be in the form of a clamp or any other similar connector element. Similarly, a negative wire (19) extends from housing (3) at a proximal end and includes a negative lead (21) at the distal end. Negative lead (21) is configured to electrically couple with negative terminal (13) and may be in the form of a clamp or any other similar connector element.

In some embodiments of battery exercising device (1), rather than being a "one-to-one" configuration for charging one battery (9), various features and circuitry may be provided to enable a "one-to-many" configuration and allow battery exercising device (1) to service multiple batteries, all coupled with battery exercising device (1). To facilitate charging multiple batteries, more than one positive wire (15) and more than one negative wire (19) may extend from housing (3) to be coupled with a respective battery as needed. Further, each pair of positive wire (15) and negative wire (19) may provide different terminal ends or heads, similar to positive lead (17) and negative lead (21) to allow coupling with different styles of batteries. Still further, battery exercising device (1) may charge and discharge a plurality of batteries wired together in a series circuit style, wherein each battery is similar to battery (9), such as the battery system used in an electric golf cart for example.

In the illustrated embodiment, positive wire (15) and negative wire (19) are electrically coupled with a control unit (23) disposed inside housing (3). Control unit (23) may comprise circuitry and/or electrical components operable to convey appropriate voltages and currents from power source (5) through wires (15, 19) as necessary to selectively discharge or charge battery (9). Control unit (23) may comprise a processing component (24), such as one or more of a microcontroller, including but not limited to a PIC microcontroller or other similar circuit, a microprocessor, or other similar processing devices configured to receive inputs, such as signals from input mechanism (45) and signals from one or more timers and/or sensors. Processing component (24) may include a CPU programmed to make decisions regarding what to do when it receives inputs, such as signals from input mechanism (45) and signals from one or more sensors, timers and/or counters included within exercise device (1). Processing component (24) may be a modular or plug-in component of control unit (23). This may allow for removing a first processing component (24) and replacing it with an updated or different processing component (24). Providing a modular processing component (24) may facilitate software upgrades or similar changes by the user or manufacturer. Further, other embodiments of battery exercising device (1) may provide additional features which require a different or larger processing component (24) having more input/output channels, and, thus, it may be beneficial in some instances to facilitate installation of an updated processing component (24). Control unit (23) may use logic, such as that shown in FIG. 2 and described below, to determine whether to selectively discharge or charge battery (9). That logic may be stored in and executed by the processing component (24) of control unit (23).

In some embodiments of battery exercising device (1), a fan (25) is disposed in housing (3) to provide cooling to battery exercising device. Housing (3) can also be constructed to include or define openings or vents to provide ventilation to assist with cooling. In this embodiment, fan (25) is electronically coupled to control unit (23) through fan circuitry (27) and controllable there through to selectively actuate fan (25) as needed to cool the internal chamber of housing (3) and the components disposed therein.

As shown, real time clock (29) is disposed in housing (3) to provide a continuous reliable timing element for battery exercising device (1). A real time clock can be a computer clock that keeps track of the current date, time, and day of week, and may be in the form an integrated circuit. Information provided by real time clock (29) is used by control unit (23) to determine when to initiate a charge or discharge cycle of battery (9) and also to limit the time period of both charge and discharge cycles. Real time clock (29) may use a crystal oscillator or a power line frequency or any other mechanism suitable for tracking time and providing this information to control unit (23). As shown, real time clock (29) is powered by a clock battery (31), which may be a replaceable and/or rechargeable lithium-ion style battery or any other suitable power source. Clock battery (31) can provide continuous power to real time clock (29) regardless of the operation or connection of power source (5). Thus, if power source (5) experiences a temporary power outage or other disruption in the supply of power, real time clock (29) continues to operate and account for the passage of time. Once power source (5) resumes operation or recovers from the power outage, clock battery (31) allows real time clock (29) and battery exercising device (1) to resume operation and continue operations without a disruption or delay in the time monitoring capabilities of the device (1).

As shown, real time clock (29) is electronically coupled with control unit (23) through clock circuitry (33), which allows information signals to pass between control unit (23) and real time clock (29). The determination of whether a predetermined wait period has elapsed may be made either by control unit (23) or real time clock (29). In some embodiments of battery exercising device (1), control unit (23) is programmed to periodically poll real time clock (29) for timing data such as timestamps and determines whether to initiate a charge or discharge cycle based upon this collected information. The timing data may include information regarding the current date and/or time. In some other embodiments of battery exercising device (1), real time clock (29) may determine when the predetermined wait period has expired and initiates an interrupt to control unit (23) to communicate this information and actuate control unit (23) to initiate a charge or discharge cycle. The predetermined wait period may be in the form of a specific date and/or time, such as Aug. 5, 2016, or may be in the form of a relative offset of time, such as "200 hours from now," or may be a repetitive wait period such as "every 3 weeks" or "every 200 hours." Real time clock (29) works in conjunction with processing component (24) of control unit (23) to facilitate timing related tasks and to determine when a particular period is elapsed. Utilizing a wait period that comprises a substantial amount of time, such as weeks or months, as opposed to seconds or minutes, may be useful for certain types of batteries, such as lead-acid batteries. By way of example, the wait period may comprise at least one day, preferably at least one week, more preferably at least two weeks, and still more preferably at least one month. In some embodiments, the wait period may comprise a time period within the range of about two weeks to about three months.

Some embodiments of battery exercising device (1) include an input mechanism (45). The user may actuate input mechanism (45) to configure and customize the predetermined wait period, which is the desired amount of time to wait between the end of a charge cycle and the beginning of the next discharge cycle to be performed by battery exercising device (1). In some embodiments, input mechanism (45) may comprise a knob, a button, a touch screen, or any other element for configuring and inputting wait period information into battery exercising device (1). Input mechanism (45) may comprise an external device, such as a smartphone, tablet, or computer that communicates with control unit (23) via a wired and/or wireless connection to control unit (23). For example, housing (3) may include a USB-style jack (not shown) for use in wired communication between control unit (23) and a laptop computer. In embodiments where input mechanism (45) comprises an external device that can communicate with control unit (23) via a wireless connection, the device (1) may include a wireless module, which may include a receiver, configured to allow the external device to communicate with control unit (23). The wireless connection may utilize any suitable wireless communication technology, including but not limited to Bluetooth technology. The user may then manipulate the wait period information via the laptop computer. Input mechanism (45) may comprise both an internal input device such as a knob, as well as a device for receiving period information through an external input via a wired and/or wireless connection to control unit (23). Some embodiments of battery exercising device (1) may also allow a user to provide other information via input mechanism (45) such as selecting the type of battery amp hour, such as a marine amp hour or a crank amp hour. In some embodiments input mechanism (45) may comprise more than one input device, such as multiple knobs, buttons, touch screens, or combinations thereof.

In the illustrated embodiment, input mechanism (45) is electrically coupled with control unit (23) through an input mechanism circuit (47) configured to communicate the wait period selection information from input mechanism (45) to control unit (23). In other embodiments of battery exercising device (1), the wait period for waiting between charge cycles may be stored in or accessible by control unit (23). In these embodiments, input mechanism (45) and input mechanism circuit (47) can be omitted. In some other embodiments, the wait period can be set to a default value stored in or accessible to control unit (23) unless and until the user changes the wait period through input mechanism (45).

Some embodiments of battery exercising device (1) provide the functionality and components relating to the charging of battery (9) in a charge module and the functionality and components relating to the discharging of battery (9) in a discharge module. The charge module and discharge module may be selectively inserted into housing (3) to provide the associated functionality to battery exercising device (1). For example, in some environments, discharging functionality may be desired without the accompanying charging functionality. For example, it may be beneficial to store some lithium batteries with a battery level of about 50% of the battery's full capacity. In this scenario, battery exercising device (1) includes the discharge module and omits the charge module. A user may connect battery (9) to the battery exercising device (1) prior to storage and discharge battery (9) as desired. Charge module and discharge module may be in the form of circuit boards or other electronic circuit components that may be connected or disconnected with the main circuit board of battery exercising device (1). A jumper or other type of cable element may be provided between the charge module and discharge module to electronically couple the two elements if both are disposed in battery exercising device (1). In some versions, battery exercising device (1) may be formed with a discharge module only, with control unit (23) programmed to discharge battery (9) with the discharge module and thereafter recharge battery (9) via an externally connected off-the-shelf type of recharging device.

As discussed previously, some embodiments of battery exercising device (1) may feature a "one-to-many" configuration and provide for charging multiple batteries. In some embodiments, each connected battery is associated with the overall wait period, which applies to every connected battery. Therefore, if a battery is added to the battery exercising device (1) in the middle of a wait period, that battery is charged at the expiration of the wait period, regardless of the actual charge of the battery. Further, each battery is serviced in succession, whereby once the discharge/charge cycle finishes for a first battery, battery exercising device (1) begins the discharge/charge cycle for a second battery. Battery exercising device (1) then continues to consecutively discharge/charge each battery connected to battery exercising device (1) until all batteries are serviced. Battery exercising device (1) may be configured to allow for different waiting periods for different batteries connected to battery exercising device (1) by incorporating necessary additional mechanical features such as multiple input mechanisms (45) or any other elements necessary to facilitate disparate waiting periods for multiple batteries.

In some embodiments, input mechanism (45) may also allow the user to initiate an immediate discharging and/or charging of battery (9), regardless of whether the wait period for waiting between charge cycles has expired. When the user initiates an immediate discharge/charge of battery (9), control unit (23) is programmed to proceed as if the wait period has expired, as described above. Therefore, control unit (23) proceeds to discharge battery (9) as needed to the discharge level and thereafter charges battery (9) to the charge level. This feature allows a user to immediately start the discharge/charge cycling of battery (9) as needed. In some embodiments, instead of or in addition to using input mechanism (45) to manually initiate a discharging and/or charging of the battery, device (1) may include a separate manual initiation mechanism configured to allow a user to manually initiate a discharging and/or charging of the battery. The separate manual initiation mechanism could be an internal mechanism that is built into the device (1), such as a knob, button, touch screen, or any other suitable internal input mechanism or an external mechanism, such as a smartphone, tablet, computer, or any other suitable external input mechanism. In embodiments that comprise an external input mechanism, the external input mechanism may communicate with control unit (23) via a wired and/or wireless connection to control unit (23). For example, housing (3) may include a USB-style jack (not shown) for use in wired communication between control unit (23) and a laptop computer. In embodiments where the external input mechanism can communicate with control unit (23) via a wireless connection, the device (1) may include a wireless module, which may include a receiver, configured to allow the external device to communicate with control unit (23). The wireless connection may utilize any suitable wireless communication technology, including but not limited to Bluetooth technology.

A feedback mechanism (37) may be incorporated into battery exercising device (1). Feedback mechanism (37) may be configured to provide feedback, such as audio or visual indications, to a user regarding one or more pieces of information about the battery exercising device (1) and/or battery (9). By way of example only, feedback mechanism (37) may provide audio or visual indications regarding the mode of the battery exercising device (1) (e.g., whether battery exercising device (1) is in a wait mode, discharge mode, rest mode, or charge mode), whether battery exercising device (1) is receiving power from power source (5), whether battery (9) has reached the predetermined discharge level or charge level, the progress of the charging or discharging cycle relative to the predetermined charge level or discharge level, and other similar types of information.

Feedback mechanism (37) may comprise a light, including but not limited to an LED light, connected to control unit (23) by way of a light circuit (39). In some embodiments where feedback mechanism (37) comprises a light, control unit (23) may be programmed to actuate feedback mechanism (37) to illuminate in a first color when rechargeable battery (9) is being charged (i.e., when battery exercising device (1) is in charge mode) and illuminate in a second color when rechargeable battery (9) is being discharged (i.e., when battery exercising device (1) is in discharge mode). In some embodiments of device (1), additional colors, flashing patterns, or other indicia may be provided via feedback mechanism (37) for indicating the state of the charging and/or discharging. For example, a set of three out of five rectangular shaped bars may be illuminated to indicate the charge cycle is three-fifths complete. In other embodiments of device (1), feedback mechanism (37) may comprise a display screen for providing feedback information to the user, including but not limited to alphanumeric messages or error codes. In other embodiments of device (1), feedback mechanism (37) may comprise a speaker for emitting an audible tone, beep or other sound for providing feedback information to the user. In some embodiments, device (1) may include more than one feedback mechanism, including but not limited to two or more lights, two or more speakers, or a combination of two or more lights, speakers, and displays.

When the desired wait period has elapsed, control unit (23) is programmed to initiate a discharge mode using a discharge circuit (41) to lower the voltage in battery (9). Discharge circuit (41) comprises electronic circuitry for use in draining voltage from battery (9) by allowing exercising device (1) to apply a load to battery (9) in order to drain battery (9). In some embodiments of battery exercising device (1), during the discharge mode, control unit (23) discharges battery (9) to a pre-determined voltage level, referred to hereinafter as a discharge level, which may be set by the user. In some embodiments, the duration of the discharge mode or cycle may be limited by a time limit, such as a specific number of minutes, hours, days, specific date, etc., which may also be set by the user. Allowing the discharge cycle to take place over a substantial amount of time, such as days, weeks or months, as opposed to seconds or minutes, may be useful for certain types of batteries, such as lead-acid batteries. The user may set and update the discharge level and, when applicable, the time limit for the discharge cycle through any common mechanism for interfacing with control unit (23), including through a wired connection, such as a USB port, or through a wireless connection, such as a Bluetooth® module. In some embodiments, input mechanism (45) may also allow for the user to set and update the discharge level. Various hardware, circuitry, and/or programming components of battery exercising device (1) may be modified as needed and as known within the art to allow this to be accomplished via input mechanism (45).

In some embodiments, the discharge level can be any appropriate voltage level where the battery is considered to be adequately discharged. The discharge level may be a level where the battery is considered to be partially or fully discharged. Control unit (23) may be programmed to periodically determine the present voltage level of battery (9) to determine the status of the discharge and whether the discharge level has been reached. The voltage level of battery (9) may be determined through a voltage divider circuit which feeds an analog digital conversion circuit or equivalent circuitry. Sensors may also be utilized to determine the present voltage level of battery (9). In embodiments where a time limit is utilized by control unit (23) to control the length of the discharge cycle, then control unit

(23) may also be programmed to periodically check a timer to determine if the time limit has elapsed.

In some embodiments of battery exercising device (1), the energy drawn from battery (9) during the discharge cycle may be utilized or stored for later use, rather than simply drawn and dissipated. In some of these embodiments, discharge circuit (41) may include functionality and circuitry to transfer the energy drawn from battery (9) to another element. For example, discharge circuit (41) may transfer the energy drawn from battery (9) into a second battery to charge the second battery. In other embodiments, the energy may be drawn from battery (9) and transferred into a capacitor for short term storage or an ultracapacitor for long term storage. In still other embodiments, discharge circuit (41) may transfer the energy drawn from battery (9) into a flywheel operating in a vacuum or utilize the energy to make and store hydrogen through electrolysis of water. In still other embodiments, discharge circuit (41) may feed the energy back into the electric grid. In some embodiments, other elements of battery exercising device (1) may be powered by the discharge energy acquired from battery (9) during the discharge mode to reduce the overall consumption of energy by battery exercising device (1). For example, fan (25) may be powered by the energy drawn from battery (9) during the discharge mode.

After the discharge mode is completed (i.e., the voltage level has reached the discharge level and/or the time limit for the discharge cycle has elapsed) and, in some embodiments, after an optional rest period, control unit (23) is programmed to initiate a charge mode using a charge circuit (43). Charge circuit (43) comprises electronic circuitry for use in increasing the voltage of battery (9) or otherwise recharging battery (9) by allowing battery exercising device (1) to provide a charging current to battery (9). During charge mode, control unit (23) charges battery (9) until the unit is fully recharged or until battery (9) has reached a pre-determined voltage level, referred to hereinafter as a charge level. In some embodiments, the duration of the charge mode or cycle may be limited by a time limit, such as a specific number of minutes, hours, days, specific date, etc., which may also be set by the user. Allowing the charge cycle to take place over a substantial amount of time, such as days, weeks or months, as opposed to seconds or minutes, may be useful for certain types of batteries, such as lead-acid batteries. The user may set and update the charge level and, when applicable, the time limit for the discharge cycle through any common mechanism for interfacing with control unit (23), including through a wired connection, such as a USB port, or through a wireless connection, such as a Bluetooth® module. In some embodiments, input mechanism (45) may also allow for the user to set and update the charge level.

As described above, in some embodiments, a user may be able to set and/or adjust various settings of battery exercising device (1), including but not limited to the discharge level and the charge level, via an input device, such as input mechanism (45). In some embodiments, battery exercising device (1) may comprise an input device configured to allow a user to adjust one or more settings of battery exercising device (1) depending on the size of the battery connected to battery exercising device (1). For example, in some embodiments, battery exercising device (1) may comprise an input device, such as a slide switch, a knob, a button, or any other suitable input device, configured to allow a user to alternate settings for battery exercising device (1) between settings appropriate to exercise a 12 volt battery or battery pack and settings appropriate to exercise a 6 volt battery or battery pack. By way of example only, in such an embodiment, the input device may be configured to set the discharge level at about 11.9 volts and set the charge level at about 14.1 volts or about 14.5 volts when battery exercising device (1) is being used in conjunction with a 12 volt battery or battery pack. In such an embodiment, the input device may be further configured to set the discharge level at about 5.9 volts and to set the charge level at about 7.2 volts when battery exercising device (1) is being used in conjunction with a 6 volt battery or battery pack. Of course, battery exercising device (1) may be used in conjunction with any size battery or battery pack, including but not limited to a 12 volt battery or battery pack, an 8 volt battery or battery pack, and a 6 volt battery or battery pack. In addition, in other embodiments, the particular voltage levels used for the discharge level and the charge level, the number of different potential settings, and the particular settings impacted may vary.

In some embodiments, the charge level can be less than or substantially equal to the full voltage capacity of battery (9). In embodiments where the charge level is substantially equal to the full voltage capacity of battery (9), control unit (23) fully charges battery (9), or in other words, charges battery (9) until the voltage is substantially equal to the full voltage capacity of battery (9). Control unit (23) may be programmed to periodically determine the present voltage level of battery (9) to determine the status of the recharge and whether the desired charge level has been reached. As stated above, the voltage level of battery (9) may be determined through a voltage divider circuit which feeds an analog digital conversion circuit or equivalent circuitry. Also, as stated above, sensors may also be utilized to determine the present voltage level of battery (9). In embodiments where a time limit is utilized by control unit (23) to control the length of the charge cycle, then control unit (23) may also be programmed to periodically check a timer to determine if the time limit has elapsed. Once the charge cycle is completed (i.e., battery (9) is recharged to the charge level and/or the time limit for the charge cycle has elapsed), the internal timer for the wait period is reset in the processing component (24) and the process of waiting for the wait period to elapse, discharging battery (9) to the discharge level, and recharging battery (9) to the charge level repeats.

In some embodiments, battery exercising device (1) may be configured to charge battery (9) using constant current with an upper voltage cutoff. In other words, battery exercising device (1) may be configured to charge battery (9) by providing power to battery (9) at a constant current until a predetermined voltage limit is reached, and then charging is stopped. In other embodiments, battery exercising device (1) may be configured to charge battery (9) using a combination of constant current and constant voltage, similar to current smart chargers. In such an embodiment, battery exercising device (1) may be configured to charge battery (9) using constant current first and then switch to charging battery (9) using constant voltage during the charge cycle. In such embodiments, when battery exercising device (1) is charging battery (9) using constant voltage, the battery exercising device (1) may provide power to battery (9) at a constant voltage until the current reaches a certain threshold, such as substantially zero amps. Various hardware, circuitry, and/or programming components of battery exercising device (1) may be modified as needed and as known within the art to provide the desired current and voltage features described herein.

Figure 8:
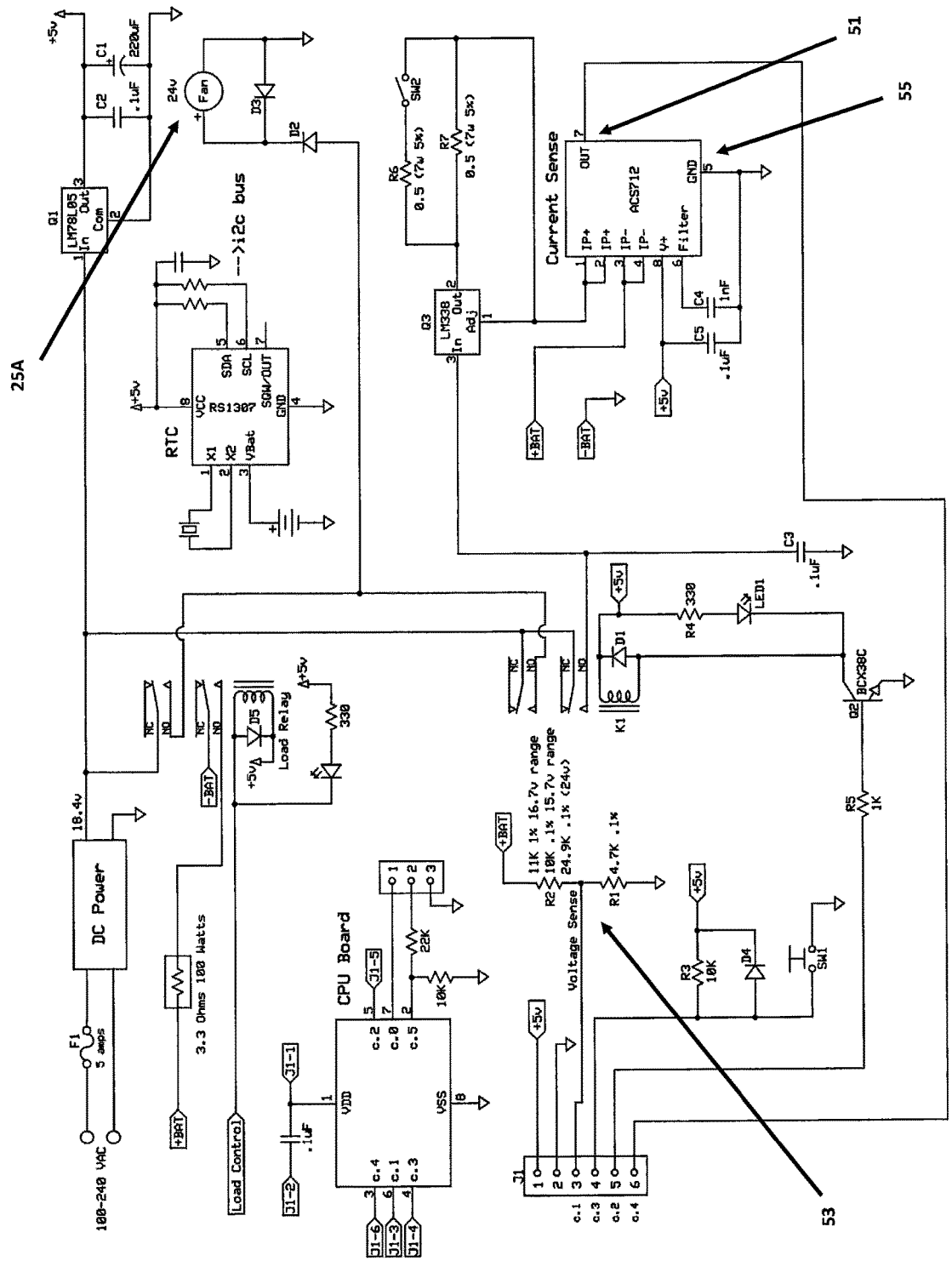
FIG. 8 depicts a circuit diagram of another exemplary circuit system used in the battery exercising device of FIG. 1.

In some embodiments of battery exercising device (1), including the embodiment illustrated in FIG. 8, a current output circuit (55), which may comprise at least one switch, is provided to allow for changing the maximum output current of battery exercising device (1). Some embodiments of current output circuit (55) may be configured to allow the user to change the output current between two or more predetermined values. Other embodiments of current output circuit (55) may be configured to allow the user to specify any target output current value up to the maximum charger rating of battery exercising device (1). Thus, a user may charge batteries with different amp hour ratings by controlling the output current. For example, the user may desire to charge a 90 amp hour battery and could set the target output current value accordingly via current output circuit (55). After the 90 amp hour battery is charged, the user may wish to charge a 50 amp hour battery and could set the target output current value accordingly via current output circuit (55). The user may actuate the change in target output current by manipulating input mechanism (45) accordingly, as input mechanism (45) is operably connected to current output circuit (55) in some embodiments of battery exercising device (1).

Figure 3:
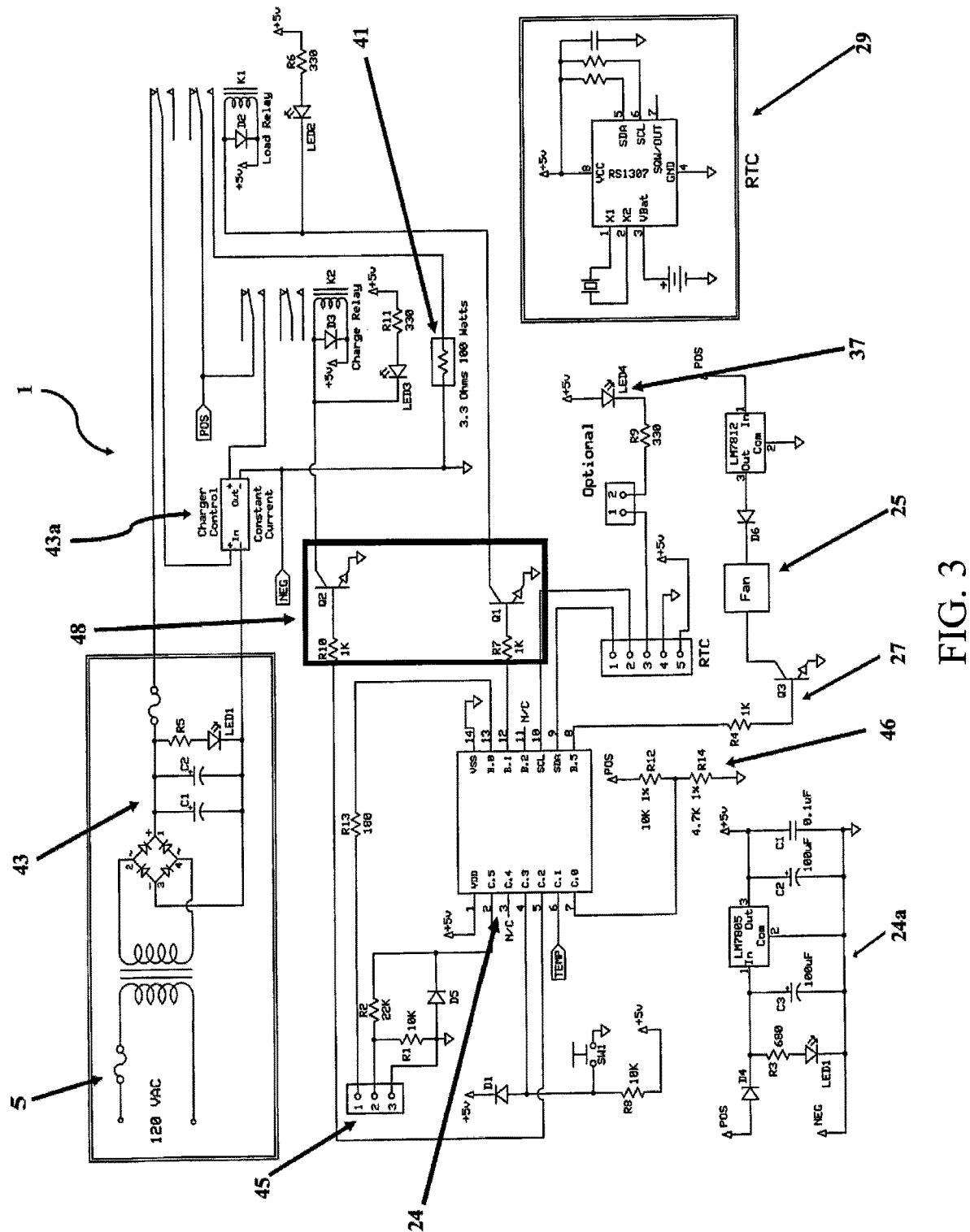
FIG. 3 depicts a circuit diagram of an exemplary circuit system used in the battery exercising device of FIG. 1.

FIG. 3 depicts an exemplary embodiment of a circuit diagram incorporating elements of battery exercising device (1), including diagrammatical features relating to power source (5), processing component (24), real time clock (29), fan (25), fan circuitry (27), light (37), discharge circuit (41), charge circuit (43), and input mechanism (45). The illustrated embodiment also includes a voltage sensing circuit (46) configured to be used to determine the current voltage level of the battery (9). Further, the embodiment illustrated in FIG. 3 includes a relay control (48) for selectively switching between discharge circuit (41) and charge circuit (43) as needed. In the illustrated embodiment, charge circuit (43) is in electrical communication with power source (5) and comprises a charge controller (43a). Charge controller (43a) is configured to regulate the power provided by power source (5) before the charging current is communicated to battery (9). Charge controller (43a) may be configured to regulate the current and/or the voltage of the power being communicated through charge circuit (43). The embodiment illustrated in FIG. 3 also includes a power regulator (24a) configured to regulate power being provided to processing component (24). Power regulator (24a) may also regulate power being provided to peripheral components connected to processing component (24) as well. Power regulator (24a) may be in electrical communication with power source (5) and battery (9) so that power regulator (24a) can draw power from power source (5) or battery (9) as needed.

Figure 4:
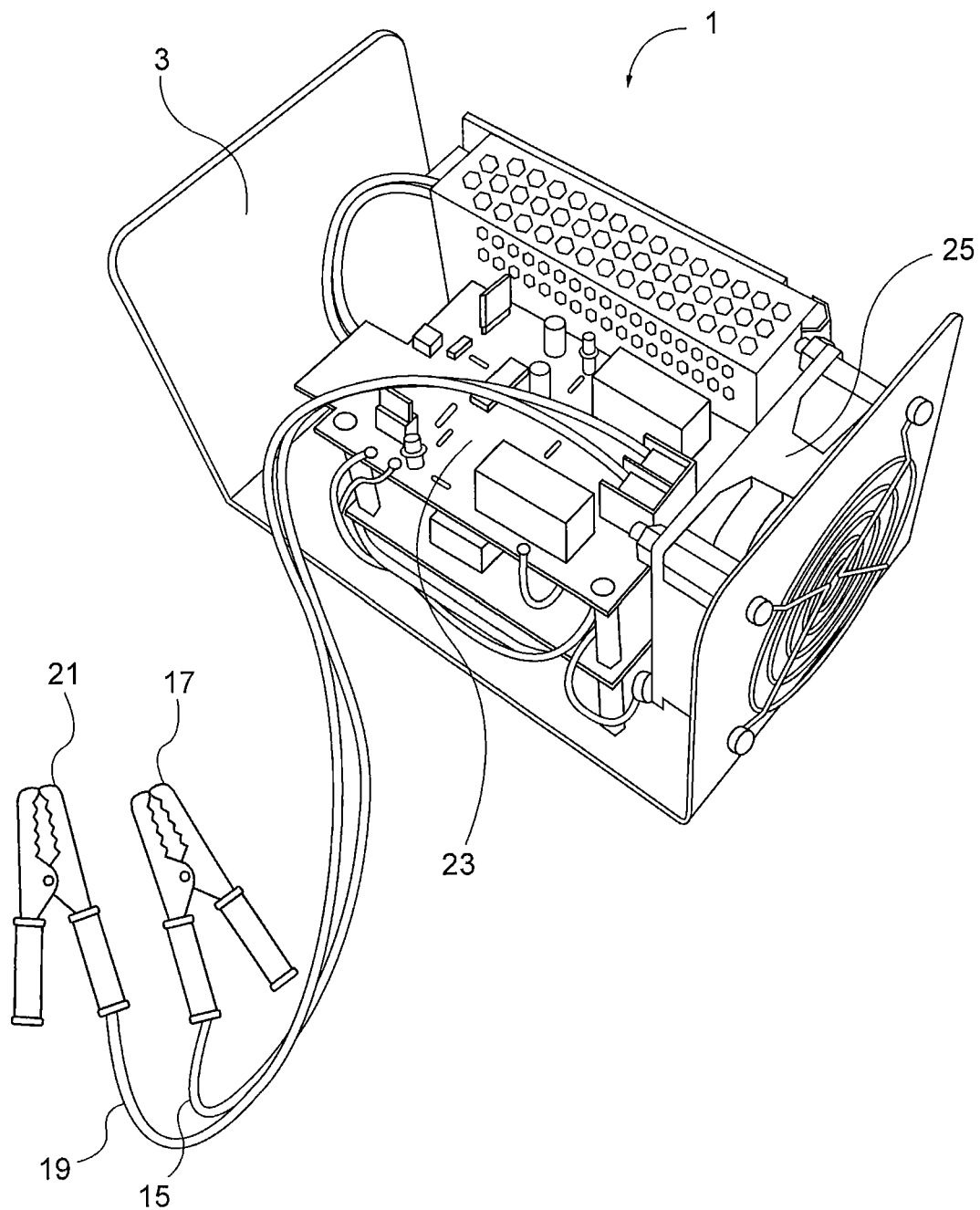
FIG. 4 depicts a perspective view of an exemplary embodiment of the battery exercising device of FIG. 1.

FIG. 4 depicts an exemplary embodiment of battery exercising device (1), showing portions of housing (3) removed and configured into a portable unit. FIG. 4 illustrates embodiments of positive wire (15), positive lead (17), negative wire (19), and negative lead (21). FIG. 4 further illustrates embodiments of control unit (23) and fan (25).

FIG. 8 depicts another exemplary embodiment of a circuit diagram incorporating elements of battery exercising device (1). Rather than a transistor-based circuit for powering fan (25), as depicted in FIG. 3, FIG. 8 depicts fan (25A) incorporated with the relay circuit configured to power charge circuit (43) or discharge circuit (41).

Some embodiments of battery exercising device (1), such as the embodiment depicted in FIG. 8, may include a current sensing circuit (51). Current sensing circuit (51) may comprise a current sensor configured to detect the amount of current battery (9) is drawing during any of the cycles or modes provided by battery exercising device (1). For example, current sensing circuit (51) may be used to determine the present state of battery (9) during an initial assessment of battery (9) with respect to the overall remaining charge prior to initiating the discharge mode. In another example, some embodiments of battery exercising device (1) are configured to provide power from battery (9) to control unit (23) during the charge cycle to allow control unit (23) to function in the event of a power failure, breaker trip, charger becoming unplugged or other issues resulting in an interruption of the power being supplied by power source (5) to battery exercising device (1). In these instances, control unit (23) may receive information via current sensing circuit (51) regarding the current dropping to zero or negative amps. Control unit (23) may be configured to respond to a zero or negative current reading from current sensing circuit (51) by turning off battery exercising device (1). In operation, a zero current reading for battery (9) may indicate that there is a problem with the connection between battery (9) and battery exercising device (1) or there is an issue with battery (9).

Some embodiments of current sensing circuit (51) may comprise a single component configured to sense current, as shown in FIG. 8. The component may be a Hall effect based linear current sensor. In some embodiments, current sensing circuit (51) may be configured to output an analog voltage. In those embodiments, those analog signals may be converted to a digital number for manipulation via logic and/or instructions stored in control unit (23) and/or processing component (24).

As discussed above, in some embodiments, including the embodiment illustrated in FIG. 3, battery exercising device (1) may comprise a voltage sensing circuit (46) configured to allow a voltage reading of the current voltage level of battery (9) to be determined by control unit (23). Processing component (24) of control unit (23) may be configured such that it can only safely receive a voltage that is below a maximum voltage threshold. In some embodiments, the voltage provided via voltage sensing circuit (46) may be higher than the maximum voltage threshold of processing component (24). As a result, these embodiments may include a voltage divider circuit (53) configured to reduce the voltage provided via voltage sensing circuit (46) to a lower voltage that is below the maximum voltage threshold of processing component (24). As a result, after passing through voltage divider circuit (53), the voltage can then be safely input to processing component (24). Voltage divider circuit (53) may be a passive linear circuit that distributes the input voltage among the components of voltage divider circuit (53) to reduce its magnitude. For example, in some embodiments of voltage divider circuit (53), two or more resisters may be connected in a series with the input voltage applied across the resistor pair and the output voltage drawn from the connection between them.

Voltage divider circuit (53) may be configured to receive the sensed voltage via voltage sensing circuit (46) as the input voltage and convert it into an output voltage that is both correlated with the input voltage and also below the maximum voltage threshold of processing component (24). For example, if the maximum voltage threshold of processing component (24) is 5.0 volts and the output of voltage sensing circuit (46) is between 1.0 and 12.0 volts, voltage divider circuit (53) may be configured to divide the input voltage by one-third and pass the converted voltage on to processing component (24). In this example, a 1.0 to 12.0 volt input from voltage sensing circuit (46) is converted to a 0.33 to 4.0 volt output from voltage divider circuit (53), which is below the upper limit threshold voltage of processing component (24).

II. PERIODIC RECHARGING METHOD

Figure 2:
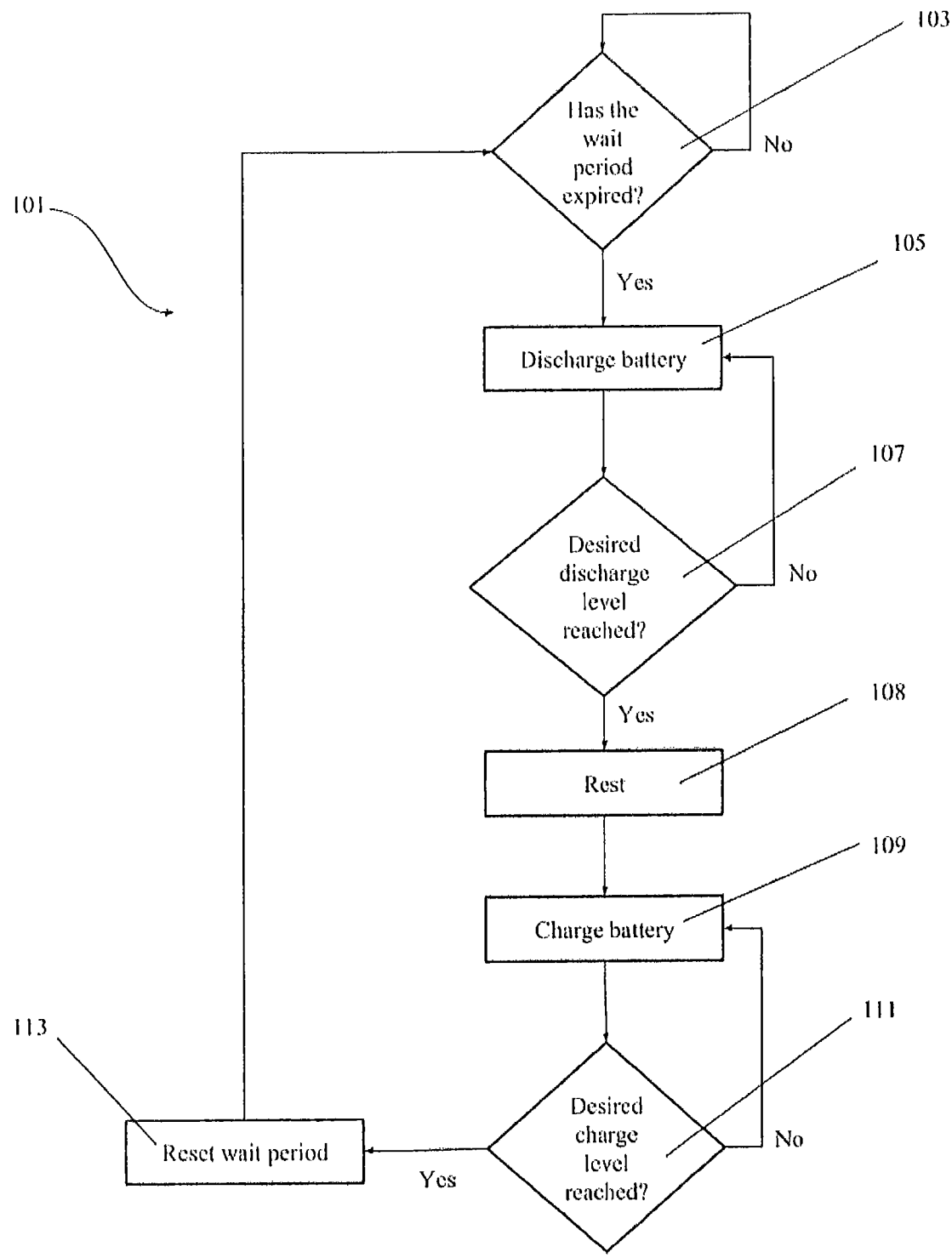
FIG. 2 depicts a flowchart of an exemplary method of using the battery exercising device of FIG. 1.

A method for periodic recharging of a battery, such as rechargeable battery (9) is illustrated in FIG. 2 as periodic recharging method (101). The logic and instructions to complete these steps may be stored in and executed by processing component (24). Battery exercising device (1), and preferably control unit (23), may comprise one or more sensors, timers, and/or counters that may be used to execute various steps within periodic recharging method (101).

As shown, periodic recharging method (101) begins with a wait period check (103) whereby a determination is made as to whether a wait period has elapsed. If the wait period has elapsed, method (101) proceeds to a discharge step (105). If the wait period has not yet elapsed, wait period check (103) repeats. With reference to FIG. 1, the wait period may be set by a user via an input device, such as input mechanism (45), or the wait period may be a pre-set system parameter accessible by control unit (23). Real time clock (29) directs processing component (24) to start a cycle and, subsequently, the processing component (24) tracks the elapsed time. That wait time being tracked by the processing component (24) may then be used in determining whether the wait period has elapsed. The wait period may be a time frame or a specific time/date. In some embodiments, control unit (23) may be programmed to apply a trickle charge to battery (9) during the wait period.

If the wait period has elapsed, then method (101) proceeds to discharge step (105) where the battery is discharged. As discussed above, in discharge step (105) control unit (23) initiates a discharge mode whereby discharge circuit (41) drains the voltage from the battery. Thereafter, method (101) proceeds to a discharge level check (107) whereby a determination is made as to whether the battery has reached the desired discharge level. This determination may be made by polling or sampling the battery voltage to determine the current voltage level of the battery (9) and determining whether the polled voltage level has reached a desired discharge level. By way of example only, the polling may be performed every minute or every thirty seconds, or any other suitable time period. If the battery is fully discharged, method (101) proceeds to a rest step (108). If the battery hasn't yet reached the discharge level, method (101) proceeds back to discharge step (105) to continue discharging the battery. In some embodiments, the user may specify or input a specific time frame for discharging battery (9). By way of example only, the user may specify a three-day time period or any other suitable time frame for discharging battery (9). The time frame for discharging battery (9) may vary depending on the size of battery (9).

If the voltage level has reached the specified discharge level, then method (101) proceeds to rest step (108) where method (101) waits for an amount of time before proceeding to a charge step (109) whereby the battery is charged. As discussed above, in charge step (109) control unit (23) initiates a charging mode whereby charge circuit (43) is utilized to charge the battery. Thereafter, method (101) proceeds to a charge level check (111) whereby a determination is made as to whether the battery has reached the desired charge level. This determination may be made by polling the battery to determine the current voltage level and determining whether the polled voltage level has reached a desired charge level. If the battery has reached the desired charge level, method (101) proceeds to a reset step (113). If the battery has not reached the desired charge level, method (101) proceeds back to charge step (109) to continue charging the battery. In some embodiments, the user may specify or input a specific time frame for charging battery (9). By way of example only, the user may specify a three-day time period or any other suitable time frame for charging battery (9). The time frame for discharging battery (9) may vary depending on the size of battery (9). In some embodiments, the user may be able to select the current being used to charge battery (9) in order to increase or decrease the amount of time required to charge battery (9) to the desired charge level. The user may set and update the current through any common mechanism for interfacing with control unit (23), including through a wired connection, such as a USB port, or through wireless connection, such as a Bluetooth® module. In some embodiments, this may be accomplished via input mechanism (45). Various hardware, circuitry, and/or programming components of battery exercising device (1) may be modified as needed and as known within the art to allow this to be accomplished via input mechanism (45).

In reset step (113) the wait period is reset to begin a new period of waiting. This may be accomplished by clearing a variable stored in a memory associated with control unit (23) or through circuitry or by any other mechanism for resetting the wait period.

III. METHOD OF OPERATION—DISCHARGE AND CHARGE

Figure 5:
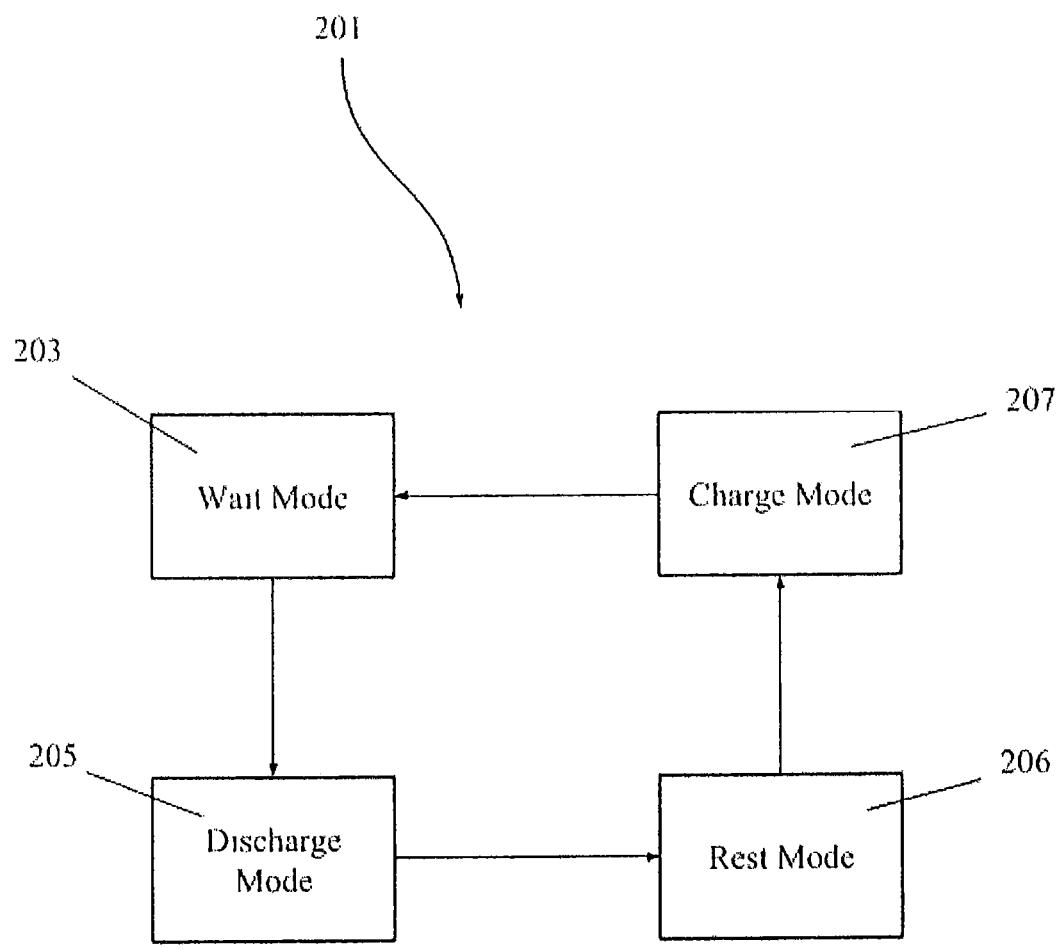
FIG. 5 depicts a diagrammatical view of an exemplary method of operation for the battery exercising device FIG. 1.

An exemplary method of operation is illustrated in FIG. 5 and referred to herein after as method of operation (201). Method of operation (201) includes four operation modes, a wait mode (203), a discharge mode (205), a rest mode (206), and a charge mode (207), and battery exercising device (1) may operate between these four modes while battery exercising device (1) is connected with rechargeable battery (9).

In wait mode (203), control unit (23) and real time clock (29) cooperate to determine whether the set wait period has elapsed. When the wait period has elapsed, method of operation (201) transitions from wait mode (203) to discharge mode (205). In some embodiments, exercising device (1) may apply a trickle charge to battery (9) during wait mode (203).

In discharge mode (205), control unit (23) engages discharge circuit (41) to discharge or drain rechargeable battery (9) to the desired discharge level. Once rechargeable battery (9) is sufficiently discharged, method of operation (201) transitions from discharge mode (205) to rest mode (206)

In rest mode (206), battery (9) is stabilized by waiting a period of time and refraining from applying either a charge or discharge current to battery (9). After the predetermined time period for rest mode (206) has elapsed, method of operation (201) transitions to charge mode (207).

In charge mode (207), control unit (23) engages charge circuit (43) to charge rechargeable battery (9) to the desired charge level. Once rechargeable battery (9) is sufficiently charged, method of operation (201) transitions back to wait mode (203) to repeat method of operation (201) or until either power source (5) or rechargeable battery (9) is disconnected from battery exercising device (1).

IV. USING A BATTERY EXERCISING DEVICE IN CONJUNCTION WITH A STANDALONE CHARGER

Figure 6A:
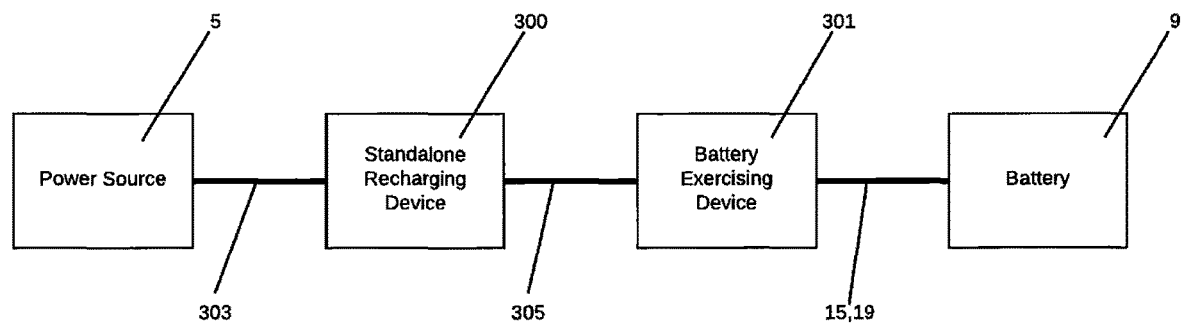
FIG. 6A depicts a diagrammatical view of an exemplary arrangement of one embodiment of a battery exercising device connected to a standalone recharging device.
Figure 6B:
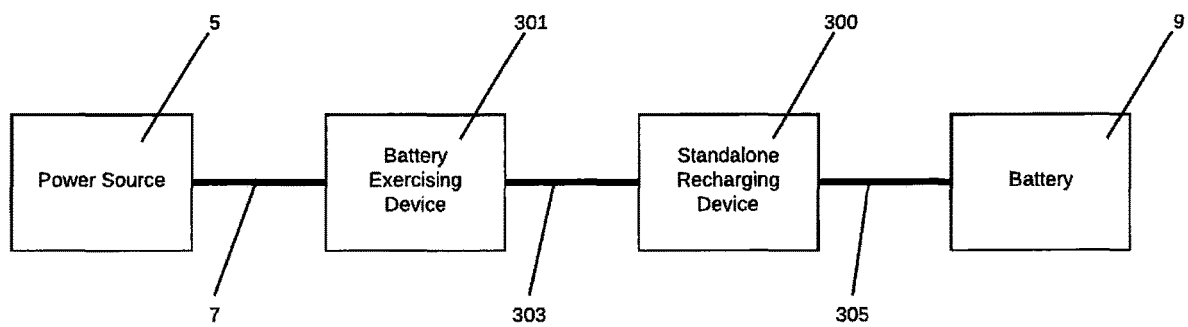
FIG. 6B depicts a diagrammatical view of an alternate arrangement of another embodiment of a battery exercising device connected to a standalone recharging device.

As shown in FIGS. 6A and 6B, embodiments of battery exercising device may be configured for use with a conventional or "off-the-shelf" standalone recharging device (300). By way of example only, standalone recharging device (300) could comprise Lester®, Sears®, or Schumacher® branded recharging devices (300). These embodiments of battery exercising device, referred to hereinafter as battery exercising device (301), may be configured to leverage the discharging and charging capabilities of ready-made components and charging devices, such as standalone recharging device (300). Typical off-the-shelf standalone recharging devices, such as recharging device (300), do not discharge the battery. Therefore, battery exercising device (301) is configured to perform the discharge cycle when used in conjunction with those types of off-the-shelf standalone recharging devices and may not be configured to perform the charge cycle on its own without utilizing the charging capabilities of the standalone recharging devices.

Standalone recharging device (300) includes a power cord (303) for connecting with a power source. As shown in FIG. 6A, in some embodiments of battery exercising device (301), standalone recharging device (300) receives power directly from power source (5) through power cord (303). Battery exercising device (301) is electrically connected to standalone recharging device (300) by a connector (305), whereby connector (305) facilitates the passing of the charge current from standalone recharging device (300) to battery exercising device (301). Connector (305) may be standard alligator clips or any other mechanism for coupling standalone recharging device (300) with another element. In some embodiments of this configuration, standalone recharging device (300) is constantly providing charging current through connector (305), with battery exercising device (301) allowing this charging current to pass through to battery (9) via positive wire (15) and negative wire (19) only after the expiration of the wait period. In other embodiments, battery exercising device (301) actuates standalone recharging device (300) to start charging at the expiration of the wait period and passes this charging current there through, using positive wire (15) and negative wire (19). In some embodiments, standalone recharging device (300) may comprise a smart charger, capable of independently monitoring and regulating charging characteristics such as voltage and percentage of battery charge and a device that uses constant current and then constant voltage to recharge a battery electrically coupled to the standalone recharging device (300). In some embodiments, standalone recharging device (300) is not configured to discharge battery (9). In this scenario, battery exercising device (301) initiates a discharge cycle directly from battery exercising device (301) to battery (9) after the wait period is expired and prior to passing the charge current from standalone recharging device (300) to battery (9).

As shown in FIG. 6B, in other embodiments, standalone charging device (300) receives power indirectly from power source (5) through battery exercising device (301), whereby power cord (303) is connected to battery exercising device (301), and battery exercising device (301) is connected directly to power source (5) via power cord (7). Upon the expiration of the wait period, battery exercising device (301) provides power to standalone recharging device (300), thus enabling standalone recharging device (300) to charge battery (9).

As shown in FIGS. 6A and 6B, in either configuration, battery exercising device (301) acts as a gatekeeper for selectively supplying or actuating a discharge/charge cycle in conjunction with standalone recharging device (300) at the expiration of the wait period. Other embodiments may include similar configurations whereby battery exercising device (301) actuates standalone recharging device (300) to charge battery (9) upon the expiration of the wait period. For example, battery exercising device (301) and standalone recharging device (300) may both be connected directly to power source (5), with battery exercising device (301) controlling the output of standalone recharging device (300) to battery (9) to ensure the wait period is enforced. Battery exercising device (301) may control or actuate output of standalone recharging device (300) through control sensing feedback using leads or other elements.

V. USING A BATTERY EXERCISING DEVICE WITH MULTIPLE BATTERIES

Figure 7:
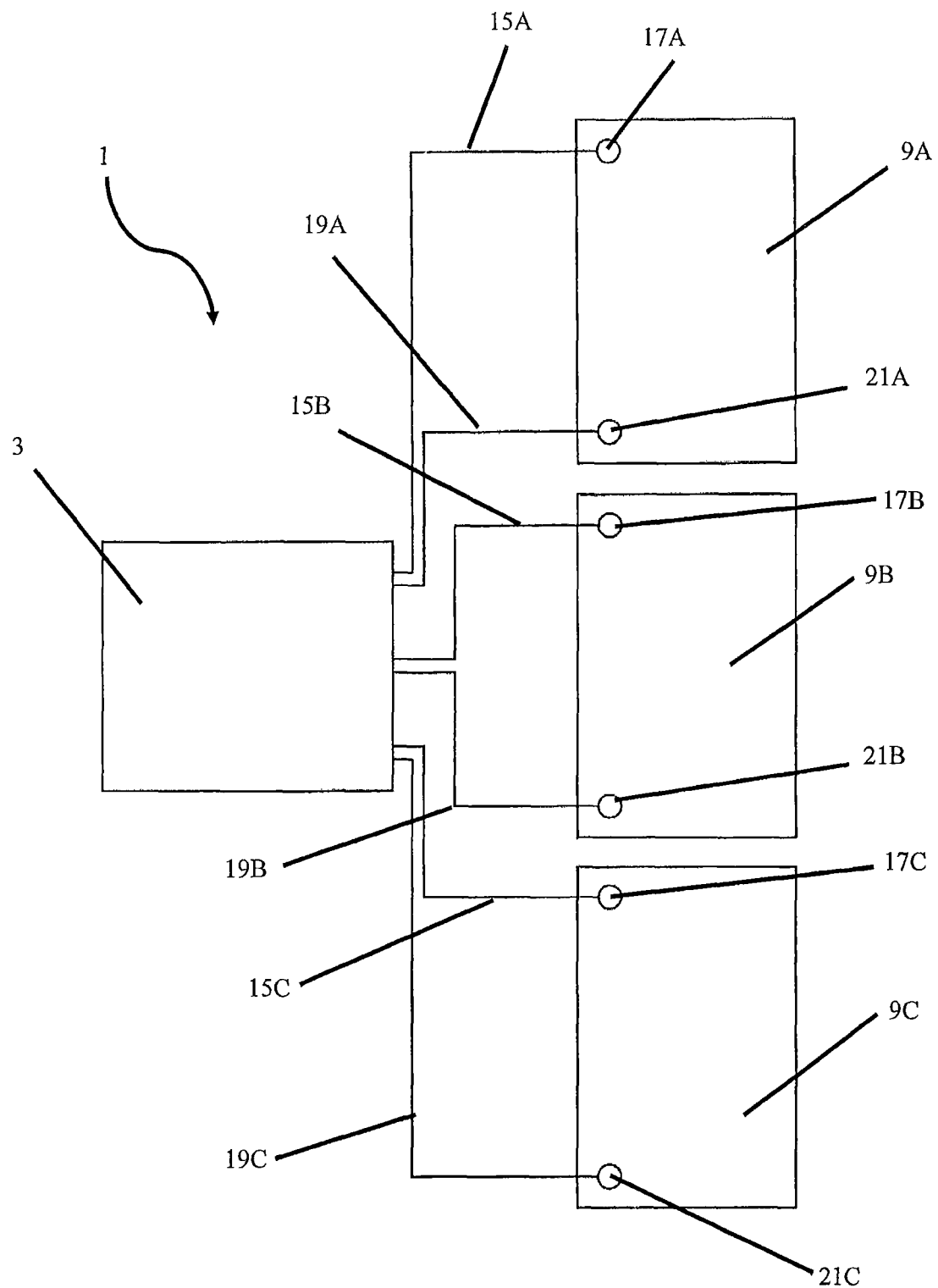
FIG. 7 depicts a diagrammatical view of an exemplary arrangement of one embodiment of a battery exercising device connected to three rechargeable batteries.

FIG. 7 illustrates an embodiment of battery exercising device (1) connected to three batteries, namely, battery (9A), battery (9B), and battery (9C). In this embodiment, battery exercising device (1) is coupled with battery (9A) through positive wire (15A) and negative wire (19A). Similarly, battery exercising device (1) is coupled with battery (9B) through positive wire (15B) and negative wire (19B) and coupled with battery (9C) through positive wire (15C) and negative wire (19C). In this embodiment, battery exercising device (1) may provide discharging and charging to each of battery (9A), battery (9B), and battery (9C). While the embodiment shown in FIG. 7 includes three batteries (9A, 9B, 9C), other embodiments may include two batteries or four or more batteries.

In embodiments that include two or more batteries, battery exercising device (1) may be configured to charge and discharge multiple independent batteries sequentially or batteries electrically connected in a series or parallel configuration simultaneously. Specifically, control unit (23) may be programmed to simultaneously discharge each of the batteries to a respective discharge level, which may or may not be the same for each battery, and then simultaneously charge each of the batteries to a respective charge level, which may or may not be the same for each battery. Alternatively, control unit (23) may be programmed and include additional switching circuitry to discharge the first battery to a first discharge level and then charge the first battery to a first charge level, while the remaining battery or batteries are waiting to be exercised (i.e., while control unit (23) is in wait mode with respect to the other battery or batteries). Subsequently, once the first battery has been exercised (i.e., discharged to the first discharge level and charged to the first charge level), then control unit (23) may be programmed to begin discharging the second battery to a second discharge level, and so on, until each of the batteries has been exercised in sequence. There may be a respective wait period associated with each of the batteries as well.

VI. BATTERY ASSESSMENT

Figure 9:
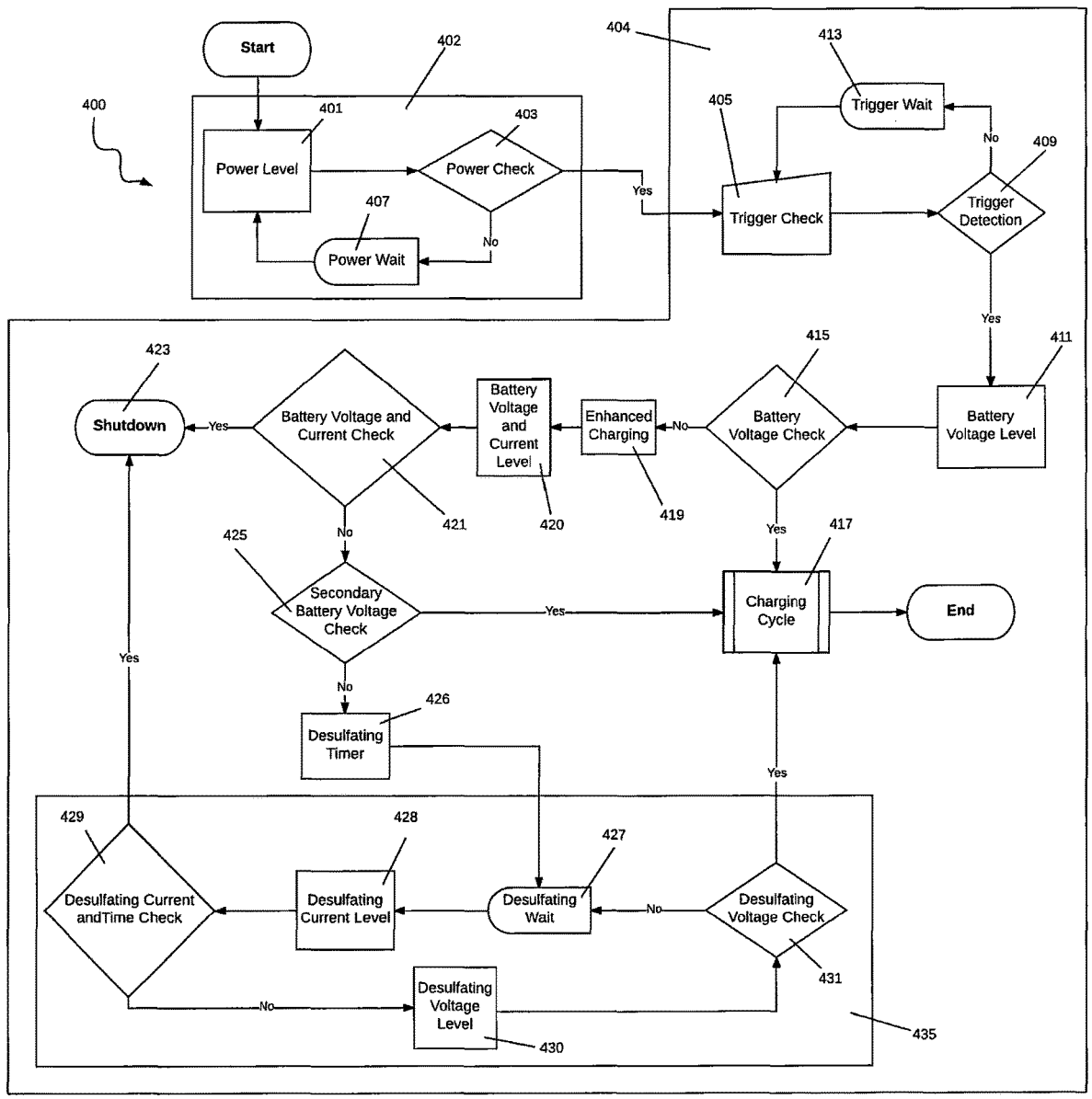
FIG. 9 depicts a flowchart of another exemplary method of using the battery exercising device of FIG. 1.

A method for conducting an assessment of the operating condition and recharging of a battery, such as rechargeable battery (9), is illustrated in FIG. 9 as initial battery assessment method (400). The logic and instructions to complete these steps may be stored in and executed by processing component (24). Battery exercising device (1), and preferably control unit (23), may comprise one or more sensors, timers, and/or counters that may be used to execute various steps within initial battery assessment method (400). Initial battery assessment method (400) may be used to assess whether battery (9) suffers from an internal short circuit or other issue rendering it unsafe or unable to be charged. In some embodiments of initial battery assessment method (400), battery exercising device (1) will not fully charge battery (9) if control unit (23) determines battery (9) is unsafe or otherwise unable to be charged upon the completion of initial battery assessment method (400). In some embodiments, initial battery assessment method (400) may be an initial step that occurs once battery exercising device (1) is connected to battery (9). Furthermore, in some embodiments, all or part of initial battery assessment method (400) may be conducted periodically while battery exercising device (1) is connected to battery (9). By way of example only, all or part of initial battery assessment method (400) may be conducted after battery exercising device (1) has been connected to battery (9) for a certain amount of time or after battery exercising device (1) has completed one of the other operating modes, such as wait mode (203), discharge mode (205), rest mode (206) and charge mode (207).

As shown in FIG. 9, initial battery assessment method (400) comprises a battery connection check loop (402) and a periodic battery assessment method (404). Battery connection check loop (402) may be executed each time battery (9) is initially connected to battery exercising device (1), while periodic battery assessment method (404) may be executed after battery connection check loop (402) is completed and periodically thereafter prior to battery exercising device (1) initiating a charge cycle or entering charge mode. In other words, when battery (9) is initially connected to battery exercising device (1) the control unit may be programmed to execute battery connection check loop (402) and, assuming the applicable conditions for battery connection check loop (402) are satisfied, then execute periodic battery assessment method (404). If battery (9) remains connected to battery exercising device (1), then the control unit may be programmed to skip battery connection check loop (402) and execute periodic battery assessment method (404) after a predetermined amount of time has elapsed or prior to allowing battery exercising device (1) to initiate a charge cycle or enter a charge mode. In some embodiments, the control unit may be programmed to execute periodic battery assessment method (404) prior to each instance of battery exercising device initiating a charge cycle or entering a charge mode. In some embodiments, the control unit may be programmed to execute periodic battery assessment method (404) after the completion of a discharge cycle or rest cycle or after exiting a discharge mode or rest mode as applicable.

In the illustrated embodiment, battery connection check loop (402) begins with power level step (401), whereby a user connects battery (9) with battery exercising device (1) and battery exercising device (1) determines the power level being provided by battery (9) and may also check the polarity of the battery (9). The power level determined during power level step (401) may be used to determine if battery (9) is connected properly with battery exercising device (1) and if battery (9) is functioning correctly.

After power level step (401) is completed, then battery assessment method (400) moves to a power check (403), whereby a determination is made as to whether the battery (9) is connected to battery exercising device (1) correctly. This determination may be made by comparing the power level determined during power level step (401) and a predetermined initial power level. By way of example only, in some embodiments the initial power level may be about 1.0 volts or any other amount suitable to allow battery exercising device (1) to determine if battery (9) is connected to battery exercising device (1) correctly. If power check (403) determines the power generated by battery (9) determined in power level step (401) is at or above the predetermined initial power level, then battery assessment method (400) proceeds out of battery connection check loop (402) to periodic battery assessment method (404), and specifically, to a trigger check (405) within periodic battery assessment method (404). Alternatively, if the power level determined during power level step (401) is below the predetermined initial power level, then battery assessment method (400) proceeds to a power wait step (407), whereby battery exercising device (1) waits for a period of time (e.g., about 2 seconds or any other suitable amount of time) and then returns to power level step (401). Power level step (401), power check (403), and power wait step (407) form a battery connection check loop (402) for continuously checking whether a battery has been properly connected to battery exercising device (1) and whether the battery is functioning correctly. A battery connected in reverse of what is expected will not satisfy the power threshold condition of power check (403) and thus will not pass on to trigger search step (405) until the battery is properly connected.

In trigger check (405), battery exercising device (1) checks for actuation of a trigger or event that is associated with initiating a charge cycle or charge mode. In some embodiments of trigger check (405), a user may manually provide the trigger via input mechanism (45). In some embodiments, a discharge cycle or discharge mode may be executed by battery exercising device (1) after power check (403) and before trigger check (405) in order to discharge battery (9) prior to charging, as described herein. In these embodiments, the trigger may be provided automatically by control unit (23) after a discharge cycle is completed and/or after a rest mode is completed, if applicable.

After the check for a charging trigger is completed, method (400) moves to a trigger detection step (409), whereby a determination is made regarding whether the charging trigger was detected or not. If a charging trigger was detected, then battery assessment method (400) proceeds to a battery voltage level step (411). If a charging trigger was not detected, then battery assessment method (400) proceeds to a trigger wait step (413). During trigger wait step (413) method (400) waits for a set period of time (e.g. about 0.2 seconds or any other suitable amount of time) and then method (400) proceeds back to trigger check (405) to continuously loop and check for actuation of a charge cycle.

Battery voltage level step (411) determines the voltage level of battery (9) and then method (400) proceeds to a battery voltage check step (415). In some embodiments, the voltage level of battery (9) may be determined via voltage sensing circuit (46). During battery voltage check step (415) a determination is made as to whether the battery is operating correctly and can safely receive a charge. This determination may be made by comparing the voltage level of battery (9) determined during battery voltage level step (411) and a predetermined initial voltage level. In some embodiments, the initial voltage level may be greater than the nominal voltage of battery (9), although this is not necessarily required. By way of example only, in some embodiments, battery (9) may comprise a nominal 12 volt battery or battery pack and the initial voltage level may be about 12.25 volts, while in other embodiments, including some with a nominal 12 volt battery or battery pack or with some other size battery or battery pack, initial voltage level may be any other voltage level suitable to allow battery exercising device (1) to determine if battery (9) is operating correctly and if battery (9) can safely receive a charge.

If the voltage level of battery (9) determined during battery voltage level step (411) is greater than the initial voltage level, then method (400) proceeds to a charging cycle step (417) during which battery exercising device (1) begins charging battery (9) and method (400) terminates. In addition, in some embodiments, method (400) may also proceed to the charging cycle step (417) if the voltage level of battery (9) determined during battery voltage level step (411) is equal to the initial voltage level. During charging cycle step (417), battery exercising device (1) may begin charging battery (9) in any suitable manner, including but not limited to by initiating a step or entering a mode such as charge step (109) or charge mode (207) described herein. In some embodiments, charging cycle step (417) may include charging battery (9) using constant current.

If the voltage level of battery (9) determined during battery voltage level step (411) is less than the initial voltage level, then method (400) proceeds to an enhanced charging step (419) during which the applied voltage of battery (9) is allowed to reach up to a maximum applied voltage level, which may be above the nominal voltage of battery (9). In addition, in some embodiments, method (400) may also proceed to the enhanced charging step (419) if the voltage level of battery (9) determined during battery voltage level step (411) is equal to the initial voltage level. The actual applied voltage of battery (9) may depend on the amount of applied voltage battery (9) is capable of receiving. Allowing the applied voltage of battery (9) to reach a voltage level that is higher than the nominal voltage of battery (9) may reduce soft sulfation and slight grid corrosion of battery (9). Even mild sulfation on a battery can lead to the battery having less cranking power, longer charging times, and/or a reduced amp hour capacity. A reduction of sulfation on battery (9) may allow a battery that was not initially ready or safe to receive a charge to become able to safely receive a charge via charging cycle step (417). By way of example only, if battery (9) has a nominal voltage of 12 volts, the maximum applied voltage level may be 18 volts, thereby allowing the applied voltage on battery (9) to reach whatever level battery (9) is capable of receiving, up to 18 volts.

After a battery voltage and current check time period has elapsed, then method (400) moves to a battery voltage and current level step (420). The battery voltage and current check time period may be any predetermined amount of time, including an amount of time suitable to allow for at least some reduction in sulfation of battery (9). In some embodiments, the battery voltage and current check time period may be about 45 seconds or any other suitable amount of time. In some embodiments, even after the battery voltage and current check time period has elapsed and method (400) has moved on to battery voltage and current level step (420), the applied voltage of battery (9) may continue to be allowed to reach up to the maximum applied voltage level as method (400) proceeds through subsequent steps, such as steps (420, 421, 425, 426, 427, 428, 429, 430, 431).

Battery voltage and current level step (420) determines the voltage level and the current level of battery (9) and thereafter method (400) proceeds to a battery voltage and current check step (421). In some embodiments of battery voltage and current level step (420), the voltage level of battery (9) may be determined via voltage sensing circuit (46). In some embodiments of battery voltage and current level step (420), the current level of battery (9) may be determined via current sensing circuit (51). The sensed voltage and current are collected and utilized during battery voltage and current check step (421).

During battery voltage and current check step (421) a determination is made as to whether the battery is operating correctly and can safely receive a charge after undergoing enhanced charging step (419). This determination may be made by comparing the voltage level and current level of battery (9) determined during battery voltage and current level step (420) and a predetermined upper voltage level and a predetermined upper current level. By way of example only, in some embodiments the upper voltage level may be about 16.1 volts and the upper current level may be about 4.1 amps. Other values for the upper voltage level and the upper current level suitable to allow battery exercising device (1) to determine if battery (9) is operating correctly and can safely receive a charge may be used in other embodiments. If the voltage level of battery (9) determined during battery voltage and current level step (420) is greater than the upper voltage level and the current level of battery (9) determined during battery voltage and current level step (420) is greater than the upper current level, then that may be an indication battery (9) is not working correctly and is not safe to receive a charge. As a result, in that case, method (400) proceeds to a shutdown step (423), whereby method (400) terminates and the battery exercising device (1) turns off. In addition, in some embodiments, method (400) may also proceed to the shutdown step (423) if the voltage level of battery (9) determined during battery voltage and current level step (420) is greater than the upper voltage level and the current level of battery (9) determined during battery voltage and current level step (420) is equal to the upper current level. In other embodiments, method (400) may also proceed to the shutdown step (423) if the voltage level of battery (9) determined during battery voltage and current level step (420) is equal to the upper voltage level and the current level of battery (9) determined during battery voltage and current level step (420) is greater than the upper current level. In still other embodiments, method (400) may also proceed to the shutdown step (423) if the voltage level of battery (9) determined during battery voltage and current level step (420) is equal to the upper voltage level and the current level of battery (9) determined during battery voltage and current level step (420) is equal to the upper current level.

If the voltage level of battery (9) determined during battery voltage and current level step (420) is less than the upper voltage level or the current level of battery (9) determined during battery voltage and current level step (420) is less than the upper current level, then method (400) proceeds to a secondary battery voltage check step (425). In addition, in some embodiments, method (400) may also proceed to the secondary battery voltage check step (425) if the voltage level of battery (9) determined during battery voltage and current level step (420) is less than the upper voltage level and the current level of battery (9) determined during battery voltage and current level step (420) is equal to the upper current level. In other embodiments, method (400) may also proceed to the secondary battery voltage check step (425) if the voltage level of battery (9) determined during battery voltage and current level step (420) is equal to the upper voltage level and the current level of battery (9) determined during battery voltage and current level step (420) is less than the upper current level. In still other embodiments, method (400) may also proceed to the secondary battery voltage check step (425) if the voltage level of battery (9) determined during battery voltage and current level step (420) is equal to the upper voltage level and the current level of battery (9) determined during battery voltage and current level step (420) is equal to the upper current level During secondary battery voltage check step (425), a determination is made as to whether the battery is operating correctly and can safely receive a charge after undergoing enhanced charging step (419). This determination may be made by comparing the voltage level of battery (9) determined during battery voltage and current level step (420) and a predetermined lower voltage level. By way of example only, in some embodiments the lower voltage level may be about 13.7 volts. Other suitable values for the lower voltage level may be used in other embodiments. If the voltage level of battery (9) determined during battery voltage and current level step (420) is less than the lower voltage level, then that may be an indication battery (9) is working correctly and is safe to receive a charge. As a result, in that case method (400) proceeds to charging cycle step (417). In addition, in some embodiments, method (400) may also proceed to the charging cycle step (417) if the voltage level of battery (9) determined during battery voltage and current level step (420) is equal to the initial voltage level. If the voltage level of battery (9) determined during battery voltage and current level step (420) is greater than to the lower voltage level, then that may be an indication that battery (9) is not working correctly and is not safe to receive a charge. As a result, in that case method (400) proceeds to a desulfating loop timer step (426). In addition, in some embodiments, method (400) may also proceed to the desulfating loop timer step (426) if the voltage level of battery (9) determined during battery voltage and current level step (420) is equal to the initial voltage level.

In desulfating loop timer step (426), a timer is initiated to track how long method (400) has spent within desulfating loop (435). As described above, in some embodiments, while method (400) is performing desulfating loop timer step (426) and the subsequent steps within desulfating loop (435), the applied voltage level of battery (9) is allowed to reach up to a maximum applied voltage level, which may be above the nominal voltage of battery (9). As mentioned above, this may result in reduction of sulfation on battery (9) and, in some cases, allow a battery that was not initially ready or safe to receive a charge to become able to safely receive a charge via charging cycle step (417). After initiating the timer in desulfating loop timer step (426), method (400) enters desulfating loop (435) and proceeds to a desulfating wait step (427). During desulfating wait step (427), method (400) waits a predetermined amount of time before proceeding to desulfating current level step (428). In some embodiments the predetermined amount of time utilized for desulfating wait step (427) may be about 5 seconds or any other suitable amount of time.

Desulfating current level step (428) determines the current level of battery (9) and then method (400) proceeds to a desulfating current and time check step (429). In some embodiments, the current level of battery (9) may be determined via current sensing circuit (51).

During desulfating current and time check step (429), a determination is made as to whether to continue in the desulfating loop (435) or shut down battery exercising device (1) and terminate method (400). This determination may be made by comparing the current level of battery (9) determined during desulfating current level step (428) and a predetermined desulfating current level and determining if a predetermined desulfating time period has elapsed. In some embodiments, the determination regarding whether the desulfating time period has elapsed may be made by comparing the timer initiated in desulfating timer step (426) to the desulfating time period. In other embodiments, desulfating timer step (426) may be omitted and the timing determination in desulfating current and time check step (429) may be made using another timing element within battery exercising device, such as real time clock (29). By way of example only, in some embodiments, the predetermined desulfating current level may comprise about 0.1 amps and the desulfating time period may be about 1 hour. Of course, in other embodiments other values may be used for desulfating current level and desulfating time period suitable to allow battery exercising device (1) to determine if battery (9) is operating correctly and is safe to receive a charge.

If the current level of battery (9) determined during desulfating current level step (428) is less than the desulfating current level or if desulfating time period has elapsed, then that may be an indication that the battery (9) is not functioning correctly and is not safe for charging. As a result, if either of those conditions is satisfied, then method (400) proceeds to shutdown step (423) and method (400) is terminated. For example, if the current level determined during desulfating current level step (428) is 0 amps or below 0.1 amps, an internal thermal sensor may have detected overheating of some component of battery (9) and shut down battery (9) preventing battery (9) from providing a current. Overheating may be caused by an internal fan blockage, lost power to the fan or some other similar problem. Similarly, battery (9) may have become disconnected from battery exercising device (1) or battery exercising device (1) may have lost input power and is therefore unable to convey this power into battery (9), which would result in a current level of less than 0.1 amps. If the current level of battery (9) determined during desulfating current level step (428) is greater than the desulfating current level and if desulfating time period has not elapsed, then method (400) proceeds to desulfating voltage level step (430). In addition, in some embodiments, method (400) may also proceed to the desulfating voltage level step (430) if the current level of battery (9) determined during desulfating current level step (428) is equal to the desulfating current level and if desulfating time period has not elapsed.

Desulfating voltage level step (430) determines the voltage level of battery (9) and then method (400) proceeds to a desulfating voltage check step (431). In some embodiments, the voltage level of battery (9) may be determined via voltage sensing circuit (46).

During desulfating voltage check step (431), a determination is made as to whether the battery is operating correctly after undergoing a period of enhanced charging. This determination may be made by comparing the voltage level of battery (9) determined during desulfating voltage level step (430) and a predetermined desulfating voltage level. By way of example only, in some embodiments the desulfating voltage level may be about 13.7 volts. Other suitable values for the lower voltage level may be used in other embodiments. In some embodiments, the lower voltage level used in secondary battery voltage check step (425) may have the same value as the desulfating voltage level, while in other embodiments those two levels could have different values. If the voltage level of battery (9) determined during desulfating voltage level step (430) is less than the desulfating voltage level, then that may be an indication that battery (9) is working correctly and method (400) proceeds to charging cycle step (417). In addition, in some embodiments, method (400) may also proceed to the charging cycle step (417) if the voltage level of battery (9) determined during desulfating voltage level step (430) is equal to the desulfating voltage level. If the voltage level of battery (9) determined during desulfating voltage level step (430) is greater than the desulfating voltage level, then that may be an indication that battery (9) is not working correctly and method (400) remains in desulfating loop (435) and returns to desulfating wait step (427) and repeats the steps of desulfating loop (435). In addition, in some embodiments, method (400) may also remain in desulfating loop (435) and return to desulfating wait step (427) and repeat the steps of desulfating loop (435) if the voltage level of battery (9) determined during desulfating voltage level step (430) is equal to the desulfating voltage level.

In some embodiments, the initial voltage level utilized during battery voltage check step (415) may be less than the other applied voltage levels utilized during enhanced charging step (419), battery voltage and current check step (421), secondary battery voltage check step (425), and desulfating voltage check step (431), respectively. In addition, in some embodiments, the maximum applied voltage level utilized during enhanced charging step (419) may be greater than the voltage levels utilized during battery voltage check step (415), battery voltage and current check step (421), secondary battery voltage check step (425), and desulfating voltage check step (431), respectively. Furthermore, the upper voltage level utilized during battery voltage and current check step (421) may be greater than the lower voltage level utilized during secondary battery voltage check step (425) and desulfating voltage threshold utilized during desulfating voltage check step (431). In addition, the upper current level utilized during battery voltage and current check step (421) may be greater than the desulfating current level utilized during desulfating current and time check step (429). The various levels and time periods described above with regard to method (400) may be adjustable or non-adjustable. For example, in some embodiments, one or more of the levels and time periods may be an adjustable value and may be set by the user through input mechanism (45). In addition, in some embodiments, one or more of the levels and time periods may be a non-adjustable value stored in a memory associated with control unit (23).

When batteries remain unused for an extended amount of time (e.g., three to six months for some batteries) they may not register an accurate terminal voltage until a load is applied to the battery. As a result, an initial voltage determined prior to applying a load may not be an accurate measurement of the battery's overall health. Accordingly, in some embodiments, battery assessment method (400) may include an additional loading step or steps wherein a load is applied to battery (9) either before or while the voltage of battery (9) is determined. The application of this initial load may "wake up" the battery and reduce any phantom voltages, which may result in a more accurate assessment of the battery's ability to receive and hold a charge. As used herein, the term phantom voltage refers to a voltage that appears on a Volt-Ohm-Meter (VOM) reading prior to a load being applied to a battery but quickly disappears once a load is applied to the battery. The load may be about 6 amps to about 12 amps or any other size load suitable to reduce phantom voltages depending on the particular size of battery being used.

In some embodiments, during a loading step a load may be applied by battery exercising device (1) to battery (9) via discharge circuit (41) or a similar device. The load may be applied for a predetermined period of time (i.e., a loading period). In one embodiment, the loading period may be about three minutes or less. Of course, in other embodiments, the loading period may be any amount of time suitable to allow a sufficient load to be applied to provide an accurate voltage measurement. In some embodiments, the loading step may continue until a certain decrease in voltage of battery (9) has been determined by battery exercising device (1). The loading period may vary depending on where the loading step occurs within battery assessment method (400). By way of example only, in some embodiments where assessment method (400) includes multiple loading steps the loading period may be longer during the initial loading step than a subsequent loading step. In other embodiments where assessment method (400) includes multiple loading steps, the loading period may be substantially the same for each one. In some embodiments, once the loading period has expired, then load may be removed and battery assessment method (400) may proceed onto a step where the voltage of battery (9) is determined, including but not limited to one or more of battery voltage level step (411), battery voltage and current level step (420), secondary battery voltage check step (425), and desulfating voltage level step (430). In other embodiments, method (400) may proceed onto a step where the voltage of battery (9) is determined during the loading period such that the voltage of battery (9) is determined while the load is still being applied to battery (9).

In some embodiments, battery assessment method (400) may further include a short charging step after the loading step described above, during which a charge is applied to battery (9) for a predetermined period of time prior to determining the voltage of battery (9). The charge may be applied to battery (9) via charge circuit (43) or any other suitable device. Some embodiments may include one or more cycles of loading and charging battery (9) prior to determining the voltage of battery (9). Cycling between loading battery (9) and applying a short charge to battery (9) may provide an effective way to determine the overall condition of battery (9) and may also facilitate the breaking up of sulfation present on battery (9).

VII. METHOD OF OPERATION—BATTERY ASSESSMENT

Figure 10:
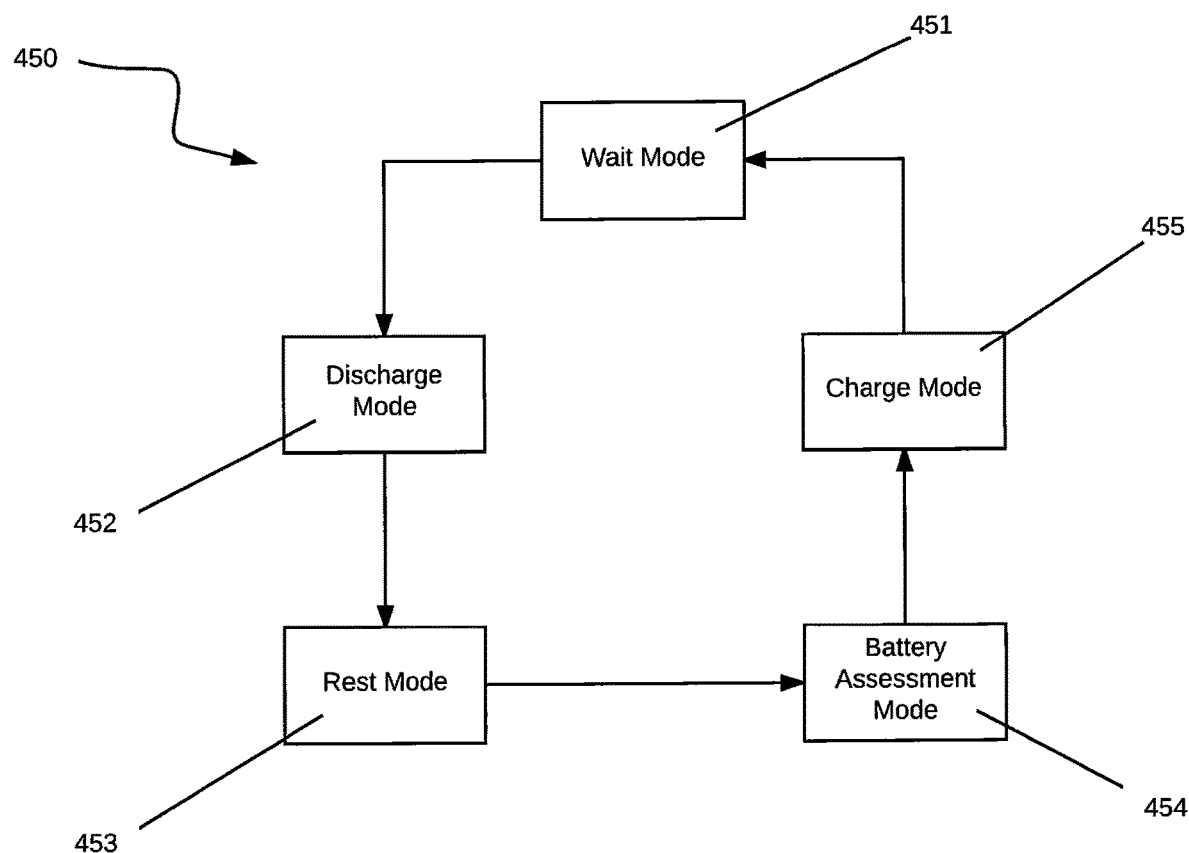
FIG. 10 depicts a diagrammatical view of another exemplary method of operation for the battery exercising device FIG. 1.

An exemplary method of operation that includes a battery assessment mode (452) is illustrated in FIG. 10 and referred to herein after as method of operation (450). Method of operation (450) includes five operation modes, a wait mode (451), a discharge mode (452), a rest mode (453), a battery assessment mode (454), and a charge mode (455), and battery exercising device (1) may operate between these five modes while battery exercising device (1) is connected with rechargeable battery (9).

Similar to wait mode (203) described above, in wait mode (451), control unit (23) and real time clock (29) cooperate to determine whether the set wait period has elapsed. When the wait period has elapsed, method of operation (450) transitions from wait mode (451) to discharge mode (452). In some embodiments, exercising device (1) may apply a trickle charge to battery (9) during wait mode (451).

Similar to discharge mode (205) described above, in discharge mode (452), control unit (23) engages discharge circuit (41) to discharge or drain rechargeable battery (9) to the desired discharge level. Once rechargeable battery (9) is sufficiently discharged, method of operation (450) transitions from discharge mode (452) to rest mode (453).

Similar to rest mode (206) described above, in rest mode (453), battery (9) is stabilized by waiting a period of time and refraining from applying either a charge or discharge current to battery (9). After the predetermined time period for rest mode (453) has elapsed, method of operation (450) transitions to battery assessment mode (454).

In battery assessment mode (454), control unit (23) conducts an assessment of battery (9) to determine if battery (9) is functioning properly and capable of being safely and adequately charged by battery exercising device (1). By way of example only, during battery assessment mode (454), control unit (23) may execute a battery assessment method, such as periodic battery assessment method (404) described above. If control unit (23) determines that battery (9) is functioning properly, then method of operation (450) transitions to charge mode (455).

Similar to charge mode (207) described above, in charge mode (455), control unit (23) engages charge circuit (43) to charge rechargeable battery (9) to the desired charge level. Once rechargeable battery (9) is sufficiently charged, method of operation (450) transitions back to wait mode (451) to repeat method of operation (450) or until either power source (5) or rechargeable battery (9) is disconnected from battery exercising device (1).

VIII. SOLAR POWER WITH BANK BATTERY

Figure 11:
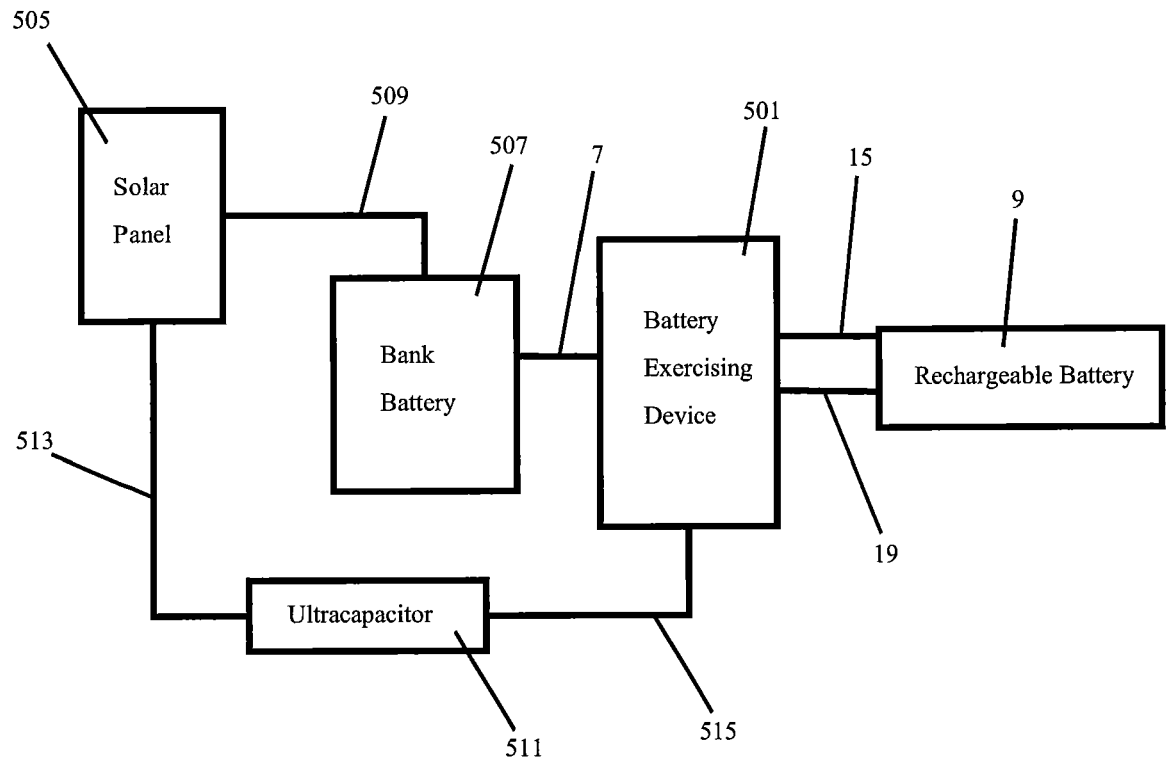
FIG. 11 depicts a diagrammatical view of another exemplary battery exercising device.
Figure 12:
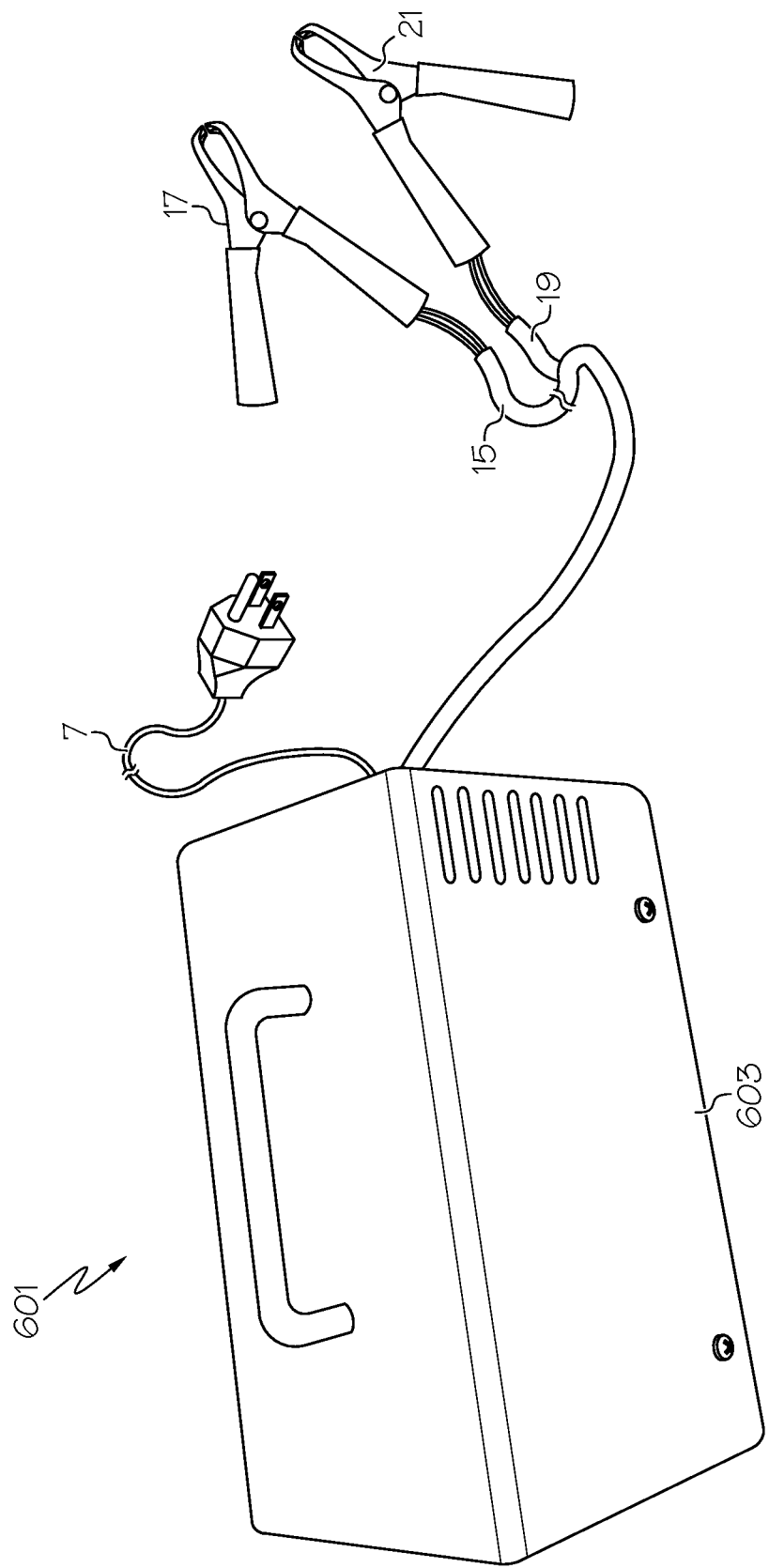
FIG. 12 depicts a left side perspective view of another exemplary battery exercising device.
Figure 13:
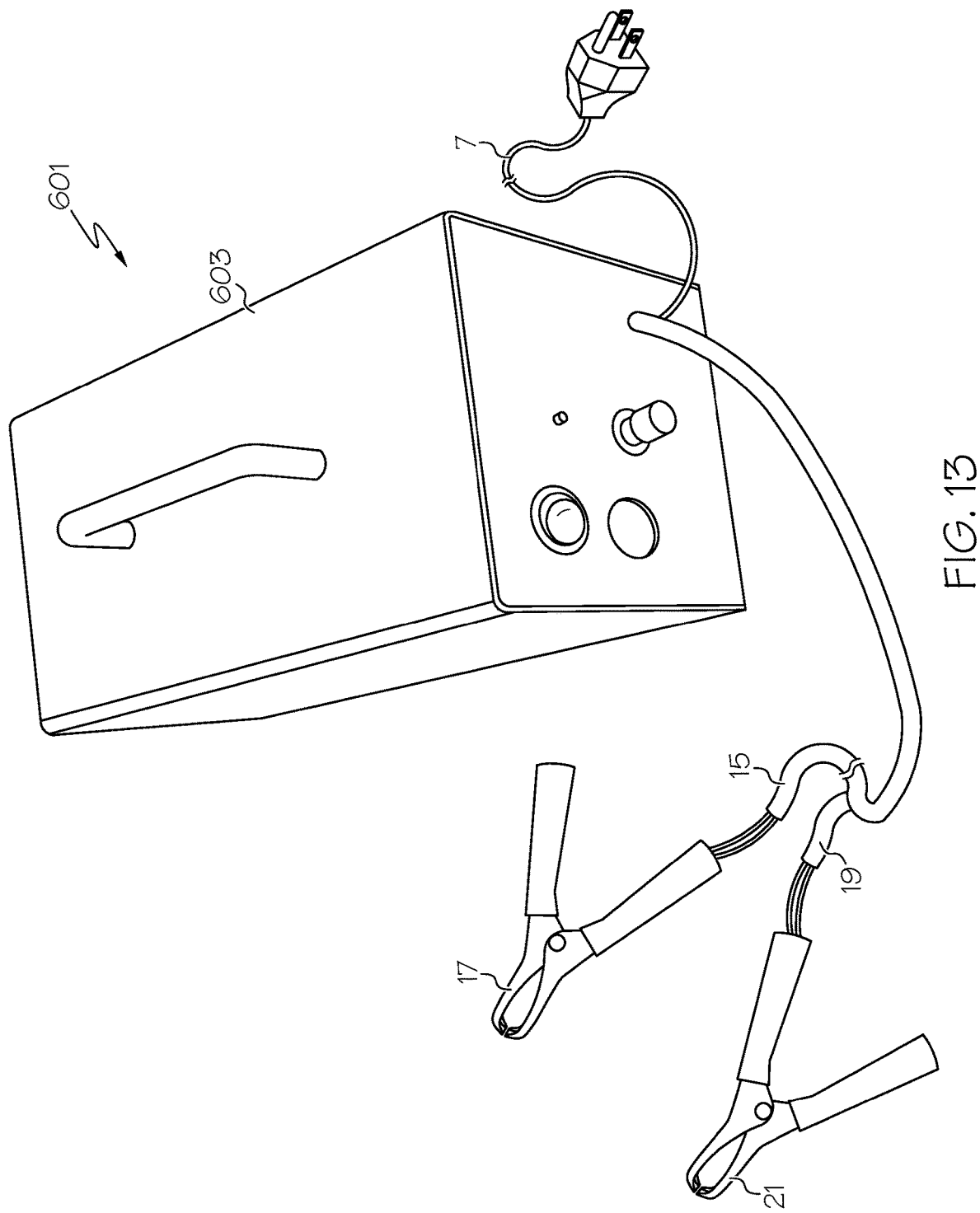
FIG. 13 depicts a front perspective view of the battery exercising device of FIG. 12.

A battery exercising device (501) is shown in FIG. 11 and is similar to battery exercising device (1) in many respects, with like numbers identifying like elements. Battery exercising device (501) is configured to exercise battery (9) by drawing power from a bank battery (507). In some embodiments of battery exercising device (501), a solar panel (505) is provided for charging bank battery (507) via a transmission line (509). Solar panel (505) is configured to convert sunlight into electrical power and provide this power to bank battery (507) for storage therein. Bank battery (507) in turn serves as a power source for battery exercising device (501), similar to power source (5) described above. In some embodiments of battery exercising device (501), bank battery (507) is a separate component and may be swapped with another battery as desired. In other embodiments of battery exercising device (501), bank battery (507) is integral and non-removable from housing (3). In these embodiments, bank battery (507) may be disposed within housing (3) or connected to the exterior of housing (3).

In addition to receiving power from solar panel (505), bank battery (507) may be used to store energy drawn from battery (9). In some embodiments of battery exercising device (501), control unit (23) is configured to store energy drawn from battery (9) into bank battery (507) when battery (9) is cycling through the various modes in the battery exercising methods of operation. For example, during the discharge mode, the energy drawn from battery (9) may be stored in bank battery (507) and later transferred back and used to recharge battery (9) during the charge mode. An ultracapacitor (511) connected to solar panel (505) through a charge controller by a power line (513) and to battery exercising device (501) by a power line (515) may also be provided to store additional power from solar panel (505) and provide this stored power to battery (9) as needed. Battery (9) may also be charged by solar panel (505) during the wait period described above and then drained of this energy during the next recharge cycle. While solar panel (505) is shown and described herein, any other suitable energy source may be used as a power source in place of solar panel (505), including but not limited to a nonrenewable energy source or other renewable energy sources such as a windmill or a hydroelectric system.

IX. LIGHTED CONNECTOR

FIGS. 19-23 depict an embodiment of a lighted connector (605) that can be attached to an end of a wire or cable, such as positive wire (15) or negative wire (19). One or more lighted connectors (605) may be used in conjunction with any suitable battery maintenance device. As used herein the term "battery maintenance device" includes any device configured to charge, discharge, and/or read the charge present in a rechargeable battery. For example, a battery maintenance device may comprise a standard battery charger, such as standalone recharging device (300) described herein, a battery exercising device, such as battery exercising device (1, 301, 501, 601) described herein, or a system comprising both a battery charger and a battery exercising device wherein the battery exercising device controls operation of the battery charger.

Lighted connector (605) may be similar to positive lead (17) and/or negative lead (21) and used to facilitate the passing of the charge current from a battery maintenance device to a battery through a cable or wire such as wire (15, 19). Lighted connector (605) is configured to be selectively secured to a rechargeable battery, such as rechargeable battery (9), and provide power to the rechargeable battery therethrough.

Figure 21:
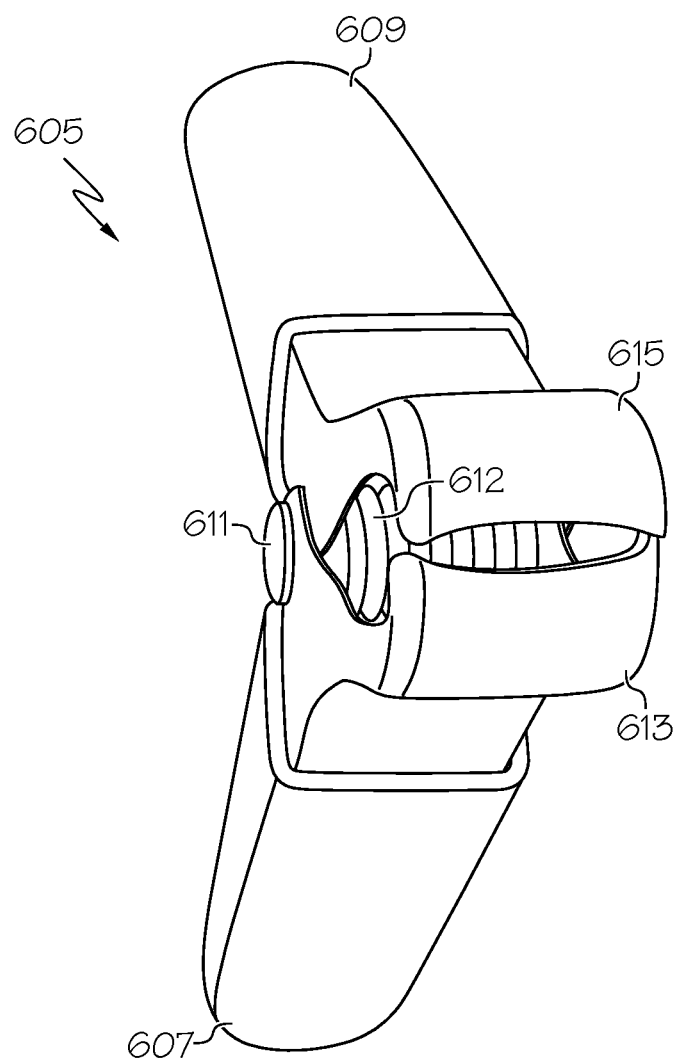
FIG. 21 depicts a front view of the lighted connector of FIG. 20 with the lighted connector in a closed position.
Figure 22:
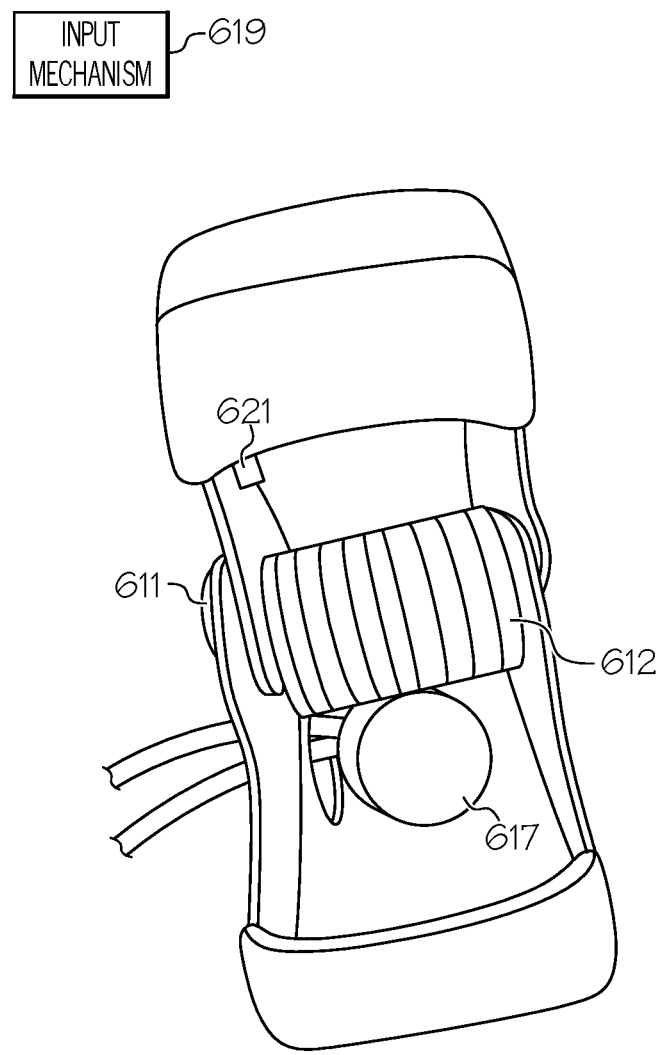
FIG. 22 depicts a front view of the lighted connector of FIG. 20 with the lighted connector in an open position.

Lighted connector (605) may be a modified version of a conventional alligator clip or any other conventional mechanism for coupling a battery maintenance device with a battery. Lighted connector (605) may have a first handle (607) and a second handle (609) for use in manually manipulating lighted connector (605) between a closed position (FIGS. 20 and 21) and an open position (FIGS. 22 and 23) along the path of Arrow A and about a hinge pin (611). For example, first handle (607) and second handle (609) may be squeezed together to transition lighted connector (605) from a closed position toward an open position. As shown in FIGS. 21 and 22, hinge pin (611) may be coupled with a spring (612) or another biasing member to bias lighted connector (605) toward either the open or closed position. Similarly, some versions of lighted connector (605) may include a first clamp arm (613) and a second clamp arm (615) for use in clamping around a portion of a battery, such as a terminal, in response to manual manipulation by a user via first handle (607) and second handle (609).

Figure 23:
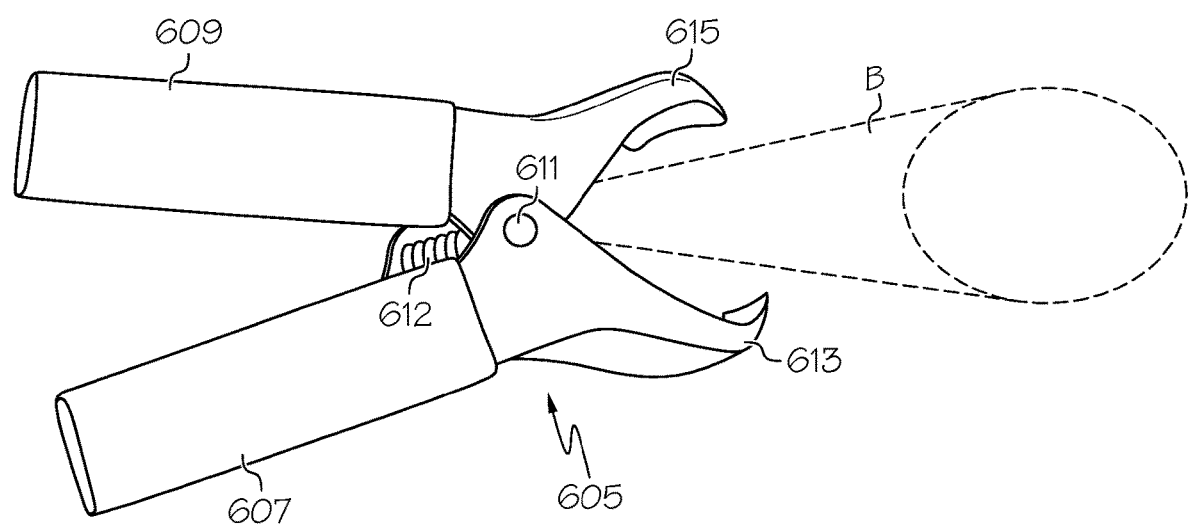
FIG. 23 depicts a side perspective view of the lighted connector of FIG. 20 with the lighted connector in the open position and the light illuminated.

As shown in FIGS. 22 and 23, lighted connector (605) includes a light (617) disposed between first clamp arm (613) and second clamp arm (615), projecting outwardly away from first handle (607) and second handle (609) to illuminate an area proximate lighted connector (605). In the illustrated embodiment, lighted connector (605) includes one light (617), but in other embodiments, lighted connector (605) may include more than one light incorporated within lighted connector (605). Light (617) may comprise an LED light or any other suitable type of light. In some embodiments, lighted connector (605) may define an internal cavity between first handle (607) and second handle (609), with light (617) disposed in the internal cavity. An exemplary illumination beam (B) is depicted in FIG. 23.

In some embodiments, lighted connector (605), and specifically light (617), may receive power from an external power source (i.e., a power source that is not disposed within or on lighted connector (605)), such as power source (5) described above. Utilizing an external power source that provides substantially continuous power, such as an electrical outlet, a generator, or other similar power source, to power light (617) may be beneficial because the external power source may not need to be replaced. As used herein, a power source that provides substantially continuous power refers to a power source that does not have a finite amount of power, such as a battery (either chargeable or rechargeable). In some embodiments where lighted connector (605) is electrically connected to a battery maintenance device, light (617) may receive power from an external source through the battery maintenance device. In those embodiments, the battery maintenance device may include a power regulator, such as power regulator (24a) described above, configured to regulate the power provided to light (617). In other embodiments of lighted connector (605), light (617) may be powered by an internal power source (i.e., a power source disposed within or on lighted connector (605)). In these embodiments, the internal power source may comprise a battery, either rechargeable or non-rechargeable, such as a lithium ion battery or an alkaline battery. Utilizing an internal power source power light (617) may be beneficial if an external power source is not readily available. In still other embodiments, lighted connector (605) may be configured to allow light (617) to receive power from either an external power source or an internal power source.

In some embodiments of lighted connector (605), light (617) may be configured to illuminate in response to an illumination triggering event. An illumination triggering event may be an event or condition that will cause the control unit in communication with light (617) to illuminate light (617). For example, in embodiments where lighted connector (605) is attached to a cable or wire in electrical communication with a battery maintenance device, light (617) may illuminate automatically whenever the battery maintenance device is turned on or whenever the battery maintenance device is connected to a power source. In these instances, the battery maintenance device being turned on or being connected to a power source would constitute an illumination triggering event. In some embodiments, lighted connector (605) and light (617) may be configured to respond to an illumination triggering event that comprises a signal from an input mechanism (619). In these embodiments, light (617) may be selectively illuminated by actuating an input mechanism (619). Input mechanism (619) may be similar to input mechanism (45), as described above, and may be embodied by a switch, a knob, or a screen associated with a battery maintenance device or a switch, knob, or a screen associated with lighted connector (605). In addition, input mechanism (619) may comprise a tablet or smartphone, which in turn may provide an interface or icon for manipulation by a user to actuate illumination of light (617). Some embodiments may include more than one type of input mechanism in communication with light (617) and/or the battery maintenance device.

Some embodiments of lighted connector (605) may be configured to illuminate light (617) when lighted connector (605) transitions from the closed position (FIGS. 20 and 21) to the open position (FIGS. 22 and 23). Having light (617) illuminated when lighted connector (605) is in an open position may allow light (617) to illuminate the area in front of lighted connector (605) while the user is connecting lighted connector (605) to a battery. Lighted connector (605) may include a sensor (621), such as a strain gauge or other type of component suitable for sensing when first clamp arm (613) and second clamp arm (615) are moving away from one another as lighted connector (605) moves from the closed position to the open position. Sensor (621) may be configured to provide a signal to a control unit and/or processing component in communication with light (617), such as control unit (23) and/or processing component (24) described herein, when lighted connector (605) transitions between an open position and a closed position that results in light (617) being illuminated or turned off depending on the position of lighted connector (605).

Some embodiments of lighted connector (605) may be configured to allow light (617) to be operated in more than one manner, including but not limited to those described above. For example, some embodiments may allow a user to select between a first operating mode wherein light (617) is automatically illuminated when an associated battery maintenance device is turned on and a second operating mode wherein light (617) is illuminated when the connector is opened. While other embodiments may allow light (617) to be illuminated in response to more than one illumination triggering event. Input mechanism (619) may be used for switching between different modes of operation for light (617). By way of example only, input mechanism (619) may be in communication with a control unit and/or processing component, such as control unit (23) and/or processing component (24) described herein, such that input mechanism (619) can be utilized to update settings or actuate illumination changes with respect to light (617).

Light (617) may be configured to turn off in response to a shut-off triggering event. A shut-off triggering event may be an event or condition that will cause the control unit in communication with light (617) to turn off light (617) (i.e., terminate illumination of light (617), such as when the user engages lighted connector (605) with a battery, when a certain amount of time has elapsed, or some other predetermined event. In some embodiments, light (617) may be configured to turn off immediately after a shut-off triggering event occurs or light (617) may be configured to turn off after a predetermined amount of time has elapsed after a shut-off triggering event occurs. For example, light (617) may be configured to turn off ten seconds, or any other suitable amount of time, after lighted connector (605) has been connected to a battery. In some embodiments, light (617) may be configured to turn off immediately after certain shut-off triggering events, while light (617) is configured to turn off after a predetermined amount of time has elapsed after other shut-off triggering events.

Light (617) may be in communication with a control unit and/or processing component, such as control unit (23) and/or processing component (24) described herein. The processing component may be positioned within a battery maintenance device associated with lighted connector (605), positioned within lighted connector (605), or positioned in any other suitable location where it can communicate with light (617). The control unit and/or processing component may be programmed to control the light in accordance with the desired parameters, such as illuminating light (617) when an associated battery maintenance device is turned on, illuminating light (617) when lighted connector (605) is transitioned to an open position, in response to instructions provided by a user via an input mechanism, etc. A user may also manually turn light (617) on or off by actuating an input mechanism, such as input mechanism (619) discussed above. For example, light (617) may illuminate via any of the mechanisms described above and when desired, the user may actuate a knob or button such as input mechanism (619) to manually turn off light (617). In some embodiments at least some of the parameters or settings, such as the wait period for how long light (617) remains on after a shut off triggering event has occurred, may be updated or set by a user through input mechanism (619) and stored in a control unit and/or processing component in communication with light (617).

In some embodiments, a system may include two lighted connectors (605) (i.e., a pair of lighted connectors) in electrical communication with a battery maintenance device. In some of those embodiments, the lights (617) may be configured to remain illuminated until both lighted connectors (605) are properly engaged with a battery (e.g., each respective lighted connector (605) is sufficiently engaged with the proper terminal on the battery). As discussed above, the lights may be in communication with a control unit and/or processing component. The control unit and/or processing component may be programmed to check to determine that the lighted connectors are properly engaged with a battery and then illuminate and turn off lights (617) accordingly. In some embodiments, the control unit and/or processing component may be further programmed to allow lights (617) to remain illuminated for a predetermined amount of time (e.g., five seconds) after the lighted connectors are properly engaged with a battery before turning the lights off. As with other parameters, that predetermined amount of time could be variable and may be determined by the user via an input mechanism in communication with the battery maintenance device and/or lighted connectors (605) in some embodiments. The control unit and/or processing component may be programmed to automatically illuminate one or both lights (617) if one or both of the lighted connectors (605) are disengaged from the battery.

In some embodiments, a system may include more than one pair of lighted connectors (605). For example, in a system that includes a sequencer, such as sequencer (625) described herein, and is configured to charge up to six batteries, the system may include six pairs of lighted connectors. In some of these embodiments, the control unit and/or processing component in communication with the lighted connectors may be programmed to operate each pair of lighted connectors independently of one another (e.g., a pair of lighted connectors may be turned off once both connectors in the pair are attached to a battery correctly, while the other pairs of lighted connectors remain lit until each respective pair is connected), in a related manner (e.g., all of the lighted connectors remain illuminated until all of the lighted connectors in the system are attached to a battery correctly), or in a combination thereof (e.g., the lighted connectors are operated independently in response to some illumination or shut-off triggering events and in a related manner in response to other illumination or shut-off triggering events). Of course, any suitable number of lighted connectors or pairs of lighted connectors may be included.

Some embodiments of lighted connector (605) may be configured to allow light (617) to flash or change colors. In these embodiments, a control unit and/or processing component in communication with light (617) may be programmed to cause light (617) to flash or change color to inform the user of system events or to otherwise provide information to the user. For example, light (617) may be configured to flash in a particular pattern or illuminate in a particular color to signify to the user that a particular illumination triggering event has occurred. Illumination triggering events could include but are not limited to the following: (i) an associated battery maintenance device detecting a problem with a battery engaged therewith; (ii) an associated battery maintenance device no longer receiving power from a power source, potentially because the power went out; (iii) overheating of an associated battery maintenance device or a battery engaged therewith; or (iv) if a component of an associated battery maintenance device needs attention (e.g., in embodiments where an associated battery maintenance device includes a real time clock powered by its own battery, when the real time clock battery needs to be replaced). For example, light (617) might be configured to flash three times and/or turn red when an associated battery maintenance device is no longer receiving power from the power source. Sensors or other data gathering elements may be positioned in various portions of lighted connector and/or an associated battery maintenance device and connected with a control unit and/or a processing component, such as control unit (23) and/or processing component (24) described herein, to provide input for detecting triggering events. Likewise, instructions for different colors or patterns may be stored in a processing component, such as processing component (24) and used to actuate light (617) in response to various triggering events.

Light (617) may be used to indicate polarity of the associated lighted connector (605) to the user. For example, in embodiments where a system includes at least two lighted connectors (605), a first lighted connector (605) may be configured to be connected to a positive terminal of a battery and, therefore, may project a first color, such as red. A second lighted connector (605) may be configured to be connected to a negative terminal of a battery and, therefore, may project a second color that is different than the first color such as green. Of course, any suitable colors may be used. In other embodiments of a lighted connector (605), light (617) may project a first color when not connected to a battery terminal and may a second color that is different than the first color when properly connected to a battery terminal.

Figure 24:
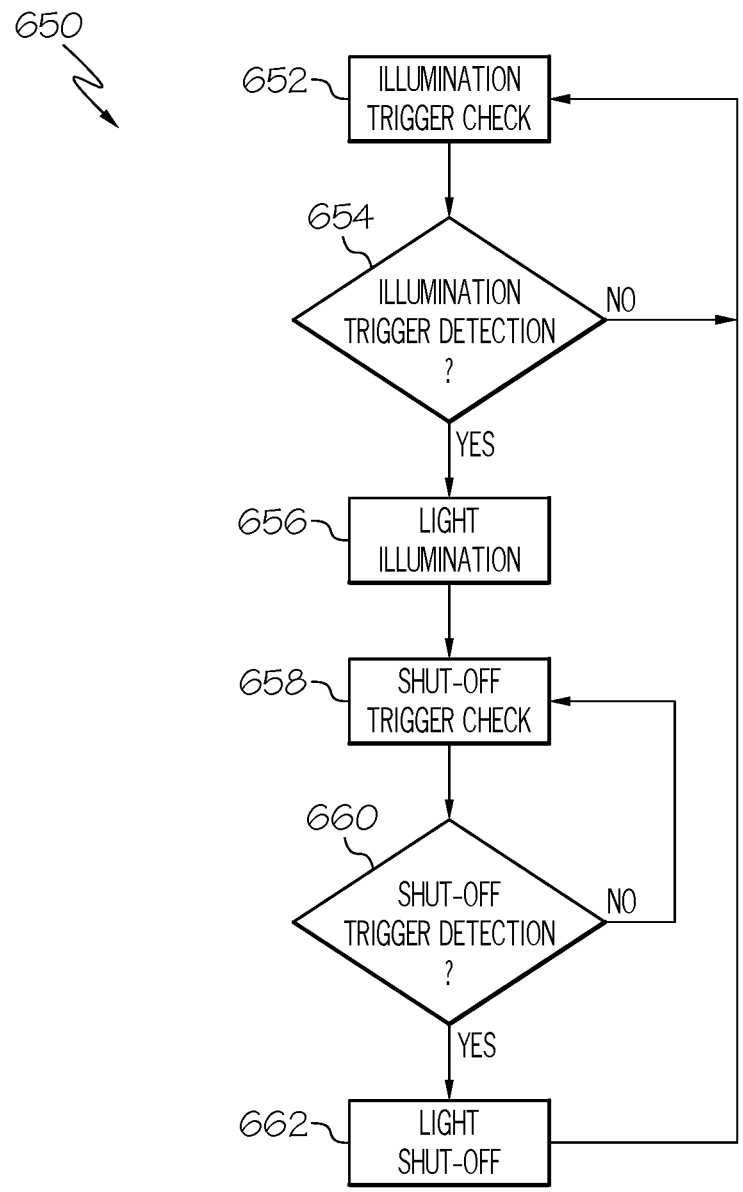
FIG. 24 depicts a flowchart of an exemplary method of operating the lighted connector of FIG. 20.

A method for operating a light in a lighted connector, such as light (617) in lighted connector (605), is illustrated in FIG. 24 as lighted connector operation method (650). The logic and instructions to complete these steps may be stored in and executed by a processing component, such as processing component (24). Lighted connector (605), and more specifically light (617) may be in communication with the processing component and/or a control unit, such as control unit (23) described herein, such that operation of light (617) may be controlled by the control unit and/or processing component. The control unit and/or processing component may be housed in lighted connector (605), a battery maintenance device associated with lighted connector (605) or any other location suitable to allow communication between the control unit and/or processing component and lighted connector (605). The system that includes lighted connector (605) may comprise one or more sensors, timers, and/or counters that may be used to execute various steps within lighted connector operation method (650).

Lighted connector operation method (650) begins with an illumination trigger check (652). During illumination trigger check (652), the control unit checks for the presence of an illumination triggering event (i.e., an illumination trigger). Various examples of an illumination triggering event are described above, including but not limited to a battery maintenance device associated with lighted connector (605) being turned on, a battery maintenance device associated with lighted connector (605) being connected to a power source, lighted connector (605) transitioning from a closed position toward an open position, and user manually providing an instruction to illuminate light (617) via input mechanism (619). The trigger may be provided automatically by the control unit once a particular illumination triggering event has been sensed or determined by the control unit and/or processing component, if applicable. The control unit and/or processing component may be programmed to illuminate light (617) in response to one or more illumination triggering events.

After the check for an illumination trigger is completed, method (650) moves to an illumination trigger detection step (654), whereby a determination is made regarding whether an illumination trigger was detected or not. If an illumination trigger was detected, then lighted connector operation method (650) proceeds to a light illumination step (656). If an illumination trigger was not detected, then lighted connector operation method (650) proceeds back to illumination trigger check (652) to continuously loop and check for the presence of an illumination trigger.

During light illumination step (656) light (617) is illuminated. In some embodiments, light (617) may be illuminated differently based on the particular illumination trigger(s) that was (were) detected. For example, light (617) may be continuously illuminated or it may flash according to a predetermined pattern or change colors to indicate to a user that a particular illumination trigger was detected. After light (617) has been illuminated during light illumination step (656), lighted connector operation method (650) proceeds to a shut-off trigger check (658). Light (617) may remain illuminated unless and until a shut-off trigger is detected, as described below.

During shut-off trigger check (658), the control unit checks for the presence of a shut-off triggering event (i.e., a shut-off trigger). Various examples of a shut-off triggering event are described above, including but not limited to lighted connector being correctly attached to a rechargeable battery, both lighted connectors being correctly attached to a rechargeable battery (in embodiments that include two lighted connectors), a certain amount of time elapsing, and user manually providing an instruction to turn off light (617) via input mechanism (619). The shut-off trigger may be provided automatically by the control unit once a particular shut-off triggering event has been sensed or determined by the control unit, if applicable. The control unit and/or processing component may be programmed to turn off light (617) in response to one or more shut-off triggering events.

After the check for a shut-off trigger is completed, method (650) moves to a shut-off trigger detection step (660), whereby a determination is made regarding whether a shut-off trigger was detected or not. If a shut-off trigger was detected, then lighted connector operation method (650) proceeds to a light shut-off step (662). If a shut-off trigger was not detected, then lighted connector operation method (650) proceeds back to shut-off trigger check (658) to continuously loop and check for the presence of a shut-off trigger.

During light shut-off step (662) light (617) is turned off. After light (617) has been turned off during light shut-off step (662) lighted connector operation method (650) proceeds back to illumination trigger check (652) to begin checking again for an illumination trigger and begin lighted connector operation method (650) again.

X. ADDITIONAL FEATURES

Some embodiments of a battery maintenance device, such as standalone recharging device (300) and battery exercising device (1, 301, 501, 601) described herein, may be configured to utilize pure direct current ("pure DC") to charge and/or maintain a battery, such as rechargeable battery (9). In these embodiments, the battery maintenance device may be configured to receive alternating current (AC) from a power source, such as power source (5) described herein, that can then be changed through rectification to a unidirectional or direct current (DC). The battery maintenance device can then use that DC to recharge a connected battery. Incomplete suppression of the alternating waveform of the AC can result in fluctuating DC or DC with a ripple voltage. The amount of ripple voltage is the amount of variation in DC output permitted under constant load. The use of capacitors and inductors can reduce ripple voltage, but to produce DC with virtually no ripple (i.e. pure DC), the filtered DC ripple voltage can be fed to a voltage regulator, such as one or more switching regulators or one or more linear regulators. The reduction of ripple voltage can be beneficial because the presence of an excessive amount of ripple can have various negative affects while charging a battery, including but not limited to component degradation, current losses, overcharges, brief discharges, and damaging heat. As used herein, the term "pure DC" refers to direct current power where all ripple voltage has been substantially eliminated (i.e., DC power that has a negligible ripple under full load when displayed on an oscilloscope). Pure DC includes DC with less than about 1 volt of ripple voltage when a full load is applied to the battery (e.g., 12 amps for a 12 amp battery), preferably the ripple voltage is less than about 500 millivolts when a full load is applied, and more preferably the ripple voltage is less than about 200 millivolts when a full load is applied. For example, in one embodiment where a battery maintenance device is configured to utilize pure DC to recharge a 12 amp battery, the ripple voltage of the pure DC provided by the battery maintenance device to the battery may be about 128 millivolts when a 12 amp load is applied to the battery.

As discussed above, there are various ways in which a battery maintenance device could provide pure DC. For example, some embodiments may utilize one or more capacitors, ultra-capacitors, voltage regulators, such as switching regulators or linear regulators, or combinations thereof to remove ripple voltage from DC power and provide pure DC. By way of example only, in some embodiments, the battery maintenance device may include an AC/DC power supply that converts an input of AC power from a power source, such as power source (5) described above, to pure DC. This pure DC can then be used by the battery maintenance device to charge and/or maintain a battery, such as rechargeable battery (9). In some embodiments of a battery maintenance device, the power supply may be configured: (i) to minimize the amount of ripple in the power provided by the power supply; (ii) such that the voltage of the power provided by the power supply is precise; and (iii) such that the voltage of the power provided by the power supply does not substantially change under load. This type of power supply is commonly referred to as a "computer grade power supply" and is conventionally used in computers. For example, some embodiments of a battery maintenance device configured to provide pure DC may include an AC/DC power supply such as the Mean Well LRS-200-15 single output switching power supply, which is commercially available from Mean Well Enterprises Co. Ltd.

Conventional battery chargers typically use an AC/DC power supply that does not provide pure DC, which can lead to various issues, as discussed above. Ripple voltage can cause a problem resulting from voltage peaks constituting an overcharge, which can cause hydrogen evolution, while the valley induces a brief discharge that can create a starved state that can result in electrolyte depletion. Using a battery maintenance device with components such as the AC/DC power supply described above, configured to charge rechargeable battery (9) with pure DC may provide a quicker and more energy dense charge. Thus, such a battery maintenance device may be able to charge rechargeable battery (9) in less time than a conventional charger that uses an AC/DC power supply that does not provide pure DC.

The use of a computer grade switching power supply, or an equivalent custom power supply, allows a battery maintenance device to operate on 90-120 or 240 AC, 50/60 hertz, or higher voltage DC. Therefore, such a battery maintenance device can work well with extremely long or small AWG AC power cables even with voltage drop down to 90 volts AC.

In some embodiments, the battery maintenance device may include programming to assess battery (9) for viability before attempting to charge and also set upper and lower voltage and does not allow overcharge or undercharge. If the battery voltage is adequate than the assessment mode can be cancelled. One example of this type of programming is battery assessment method (400) described herein. As previously described, the logic and instructions to complete these steps may be stored in and executed by a control unit and/or a processing component within a battery maintenance device, such as control unit (23) and/or processing component (24) described herein.

In some embodiments, a battery maintenance device can also be programmed to utilize artificial intelligence (AI) in order to allow the unit to learn how to adapt to certain data. For example, the battery maintenance device may be programmed to store various types of data and utilize that data to modify its operation in the future. The data could include time of day, charge times, current values, temperature readings, data from a desulfation phase, such as the steps of desulfating loop (435) described above, and any other suitable data that might help the battery maintenance device utilize AI. The data could be stored in any suitable location or structure, including but not limited to a processing component, such as processing component (24), or, in embodiments that include a real time clock such as real time clock (29), a memory chip located on the real time clock. It may be beneficial to store the data in a location other than the processing component, because in some embodiments the processing component may be modular and could be replaced or upgraded if the user so desires. Preferably, the data is stored in EEPROM memory so that the data is preserved even if there is a loss of power. The data may be analyzed in accordance with programming and algorithms or logic and various variables utilized during operation of the battery maintenance device, such as the duration of the charge time or any other suitable variable, may be adjusted for future operation based on that analysis. The programming and algorithms or logic may be stored in the memory portion of the CPU or any other suitable location or structure. In some embodiments, the data may initially be collected and stored in RAM memory of the processing component and subsequently transferred to a more permanent storage location, such as a memory chip located on the real time clock or elsewhere. The data may be transferred utilizing methods known within the art, including but not limited to an inter-integrated circuit or i2c.

In some embodiments, a battery maintenance device may be configured to provide reverse polarity protection. For example, in some embodiments, the battery maintenance device may include one or more diodes that are installed and configured to direct voltage to a feedback mechanism if the battery, such as battery (9), is connected to the battery maintenance device incorrectly (e.g., if the polarity is reversed). The feedback mechanism may be configured to provide feedback, such as audio or visual indications to the user to indicate that the battery is not connected correctly. The feedback mechanism may be incorporated within or be in addition to feedback mechanism (37) described above. By way of example only, in some embodiments the feedback mechanism may be a light. In some embodiments, in addition to the feedback mechanism, or as an alternative form of reverse polarity protection, the battery maintenance device may be programmed to shut down if the battery maintenance device is not correctly connected to the battery.

In some embodiments, a battery maintenance device may be programmed and configured to prevent arc or spark from vacant terminals. For example, in some embodiments, the battery maintenance device may include a control unit and/or processing component that includes logic and instructions so that the battery maintenance device is shut down (e.g., the output leads of the battery maintenance device are not energized) when the control unit receives an input indicating that the voltage level of the battery is currently at an undesirable level, such as zero volts or some other predetermined level based on the current operation mode of the battery maintenance device. In some embodiments, this functionality may be provided without providing reverse polarity protection. However, in other embodiments, the battery maintenance device may include programming that requires that both the correct polarity and proper voltage must be sensed before the output leads of the battery maintenance device are energized.

In some embodiments the battery maintenance device may have both charging and discharging capabilities. For example, the battery maintenance device may comprise a battery exercising device, such as battery exercising device (1, 301, 501, 601) described herein, that has both charging and discharging capabilities or the battery maintenance device may comprise a combination of a conventional battery charger, such as standalone recharging device (300) described herein, and a battery exercising device, such as battery exercising device (1, 301, 501, 601) described herein, which may have both charging and discharging capabilities or just discharging capabilities. In the latter embodiment, the battery exercising device may be in communication with the battery charger such that the battery exercising device controls at least some operation of the battery charger. In these embodiments, the battery maintenance device may have a switch, such as switch 628 shown in FIG. 18, to allow the battery maintenance device to switch between a charge mode where it could charge only and a storage mode that allows the battery maintenance device to control timed events of charge, discharge, and wait periods. By way of example, when operating in storage mode, the battery maintenance device may perform a method of operation that includes charging and discharging modes, such as methods of operation (201, 450) described herein. In embodiments where the battery maintenance device includes both a battery charger and a battery exercising device, the battery may be charged by either the battery charger or battery exercising device (if the battery exercising device includes charging capabilities) (or a combination thereof) and the battery may be discharged via the battery exercising device. This could be applicable for batteries or battery packs that need to be charged or for batteries in storage, including but not limited to batteries used for RV's, boats, golf carts, construction equipment, trucks, planes, autos, etc.

In one embodiment, the battery maintenance device may employ a plurality of discharge bursts when operating in storage mode. In such an embodiment, when the battery maintenance device is in storage mode it could charge a battery, such as battery (9), while counting a preset programmed number of days. At the end of that time, the battery maintenance device (via the battery exercising device or other component capable of discharging a battery) could place a discharge load on the battery until a preset lower voltage is reached then followed by a rest period to allow the battery to stabilize. Then the battery maintenance device would recharge the battery and the cycle begins again. For example, when the preset cycle time ends (e.g., 30-45 days) and then the battery is discharged, a discharge burst could be used for a predetermined amount of time for a predetermined number of times consecutively with a predetermined rest period between discharge bursts. In one example, about a 6 amp discharge burst could be used for about one minute for about thirty times consecutively with about a one minute rest period between discharge bursts. Of course, other suitable amounts of discharge bursts, time periods, and numbers of bursts may be used. This could be followed by a predetermined period of stabilization rest, such as about one hour or any other suitable amount of time, and then the battery could be recharged, and the cycle could begin over. Alternatively, the battery could be discharged with a continuous resistance load until a preset lower voltage level is reached or a combination of burst and continuous discharge could be employed. As described herein, the logic and instructions to complete these steps may be stored in and executed by a control unit and/or processing component within the battery maintenance device, such as control unit (23) and/or processing component (24).

This type of discharge cycle utilizing discharge bursts could be used at the end of every cycle (e.g., every 30 days). Alternatively, after a certain number of completed cycles (e.g., about every 3-4 months) the battery maintenance device may discharge with bursts as above followed by an additional constant discharge down to a lower preset voltage. Each discharge cycle can be followed by a stabilization period of rest and then the battery can be recharged, and the wait cycle can start over.

Charge/discharge cycling, such as the various cycles described herein, has been shown to increase the performance of rechargeable batteries and allow a rechargeable battery to reach 100% of its potential or intended life, especially lead acid and lithium batteries. Charging a battery before going into the wait mode, which could be 30 or more days, may be beneficial, because leaving a battery in a discharged condition can cause sulfation, a condition that makes the battery difficult, if not impossible, to recharge. A periodic discharge can help manage voltage depression problems and help the battery to remain receptive to a more complete charge. The timer system allows cyclic charge/discharge which can address two main causes of sulfate build up on lead acid battery cells: (1) batteries sitting too long between charges; and (2) storing batteries without charging. The cyclic charge/discharge can help batteries recover that have been operated over a prolonged period of time and have not routinely been charged back to near or full charge or have not been used for a long time and have developed sulfated oxide on the plates. However, it may take a number of charge discharge cycles to recover. Utilizing a battery exercising device, such as battery exercising device (1, 301, 501, 601), can aid in prevention of battery sulfation through cycles of discharging and charging regularly. Furthermore, also during an initial battery assessment, such as battery assessment method (400) described above, the battery may be checked for sulfation and if it determines that the battery is sulfated, battery exercising device (1, 301, 501, 601) can apply a higher than normal voltage for a restricted time to help remove mild sulfation.

Figure 19:
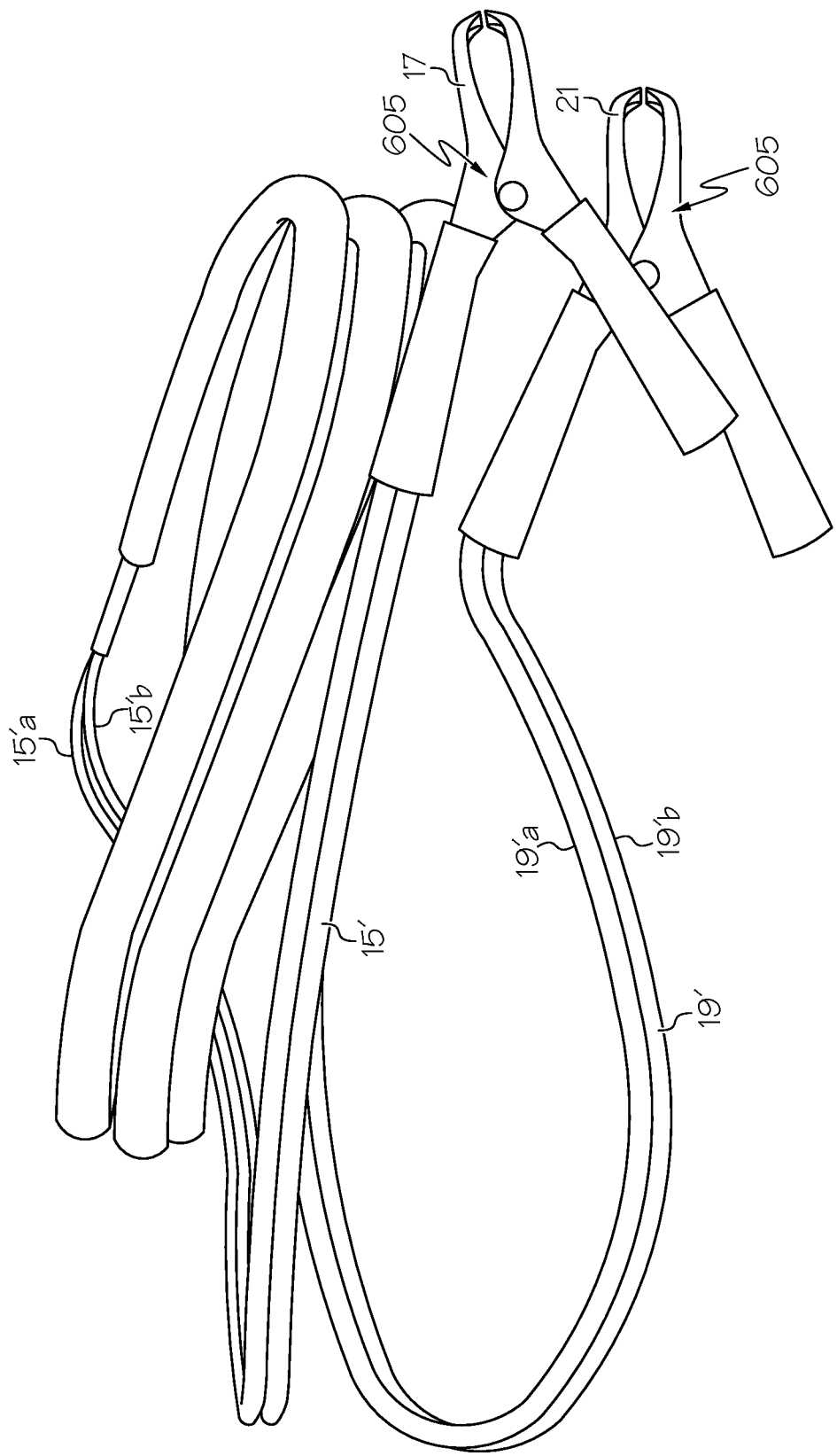
FIG. 19 depicts an exemplary set of output charging leads that include sensory cables and output leads.
Figure 20:
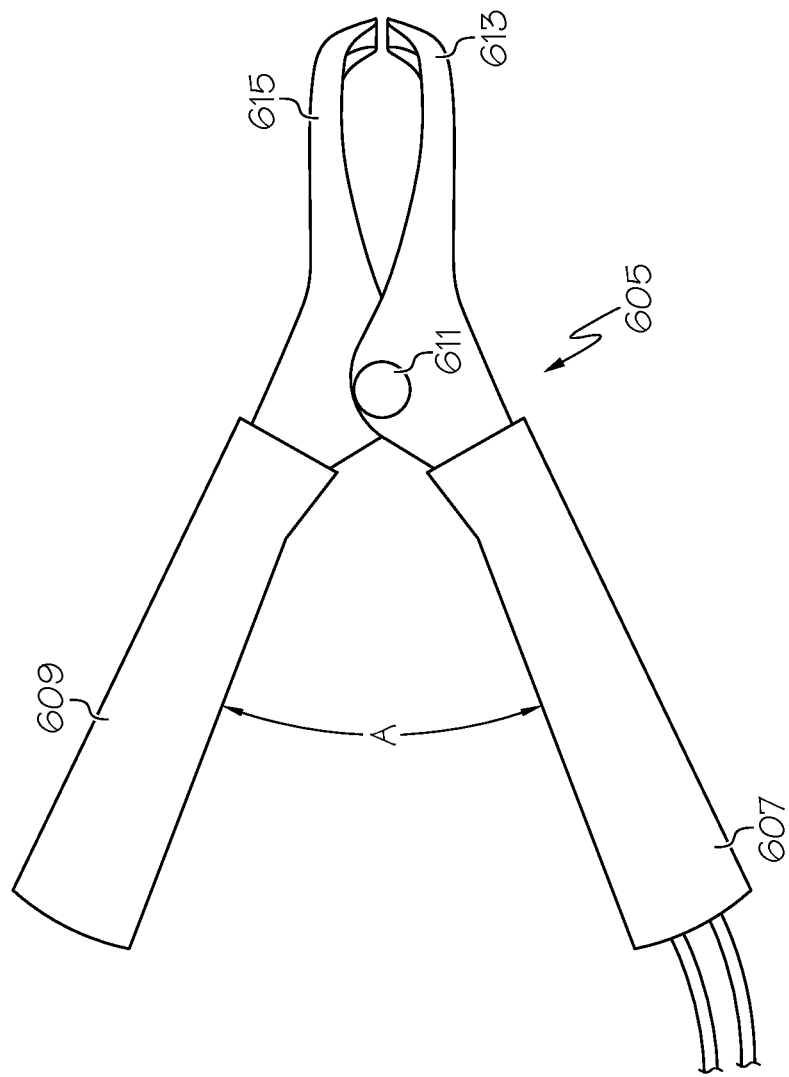
FIG. 20 depicts a side view of an exemplary lighted connector.

While a battery maintenance device is charging and/or discharging a battery, it may be advantageous to use output charging leads or cables that include both sensory cables and output cables, such as wires 15' and 19' shown in FIG. 19. In the illustrated embodiment, positive wire 15' includes a sensory cable 15'a and an output cable 15'b and negative wire 19' includes a sensory cable 19'a and an output cable 15'b. Conventional charging leads only include output cables. The output cables carry a load and, as a result, there is a voltage drop between the battery and the control unit and/or processing component of the battery maintenance device. The size of the voltage drop may depend on the length of the output charging lead (i.e., the longer the output charging lead, the larger the voltage drop). As a result, conventional charging leads that only included output cables were typically shorter in order to try to minimize the effects of the voltage drop. The sensory cables do not carry a load and, thus, there is no voltage drop between the battery and the control unit and/or processing component of the battery maintenance device, regardless the length of the sensory cables. Eliminating or reducing the voltage drop may result in the battery maintenance device providing a more accurate voltage reading of the battery. Having an output charging lead that uses output cables to carry the load and separate sensory cables to obtain the voltage reading without carrying a load may allow the use of much longer output charging leads (e.g., 20 feet or longer) because the battery maintenance device can still obtain an accurate voltage reading via the sensory cables regardless of the length of the output charging leads. Having longer output charging leads can be very beneficial and convenient when charging and especially when charging multiple vehicles or batteries (9) and especially when used with a sequencer. Output charging leads that include both sensory cables and output cables may include conventional battery connectors, such as conventional alligator clips, lighted battery connectors, such as those described herein, or any other type of connector suitable to provide adequate attachment to a battery.

Figure 16:
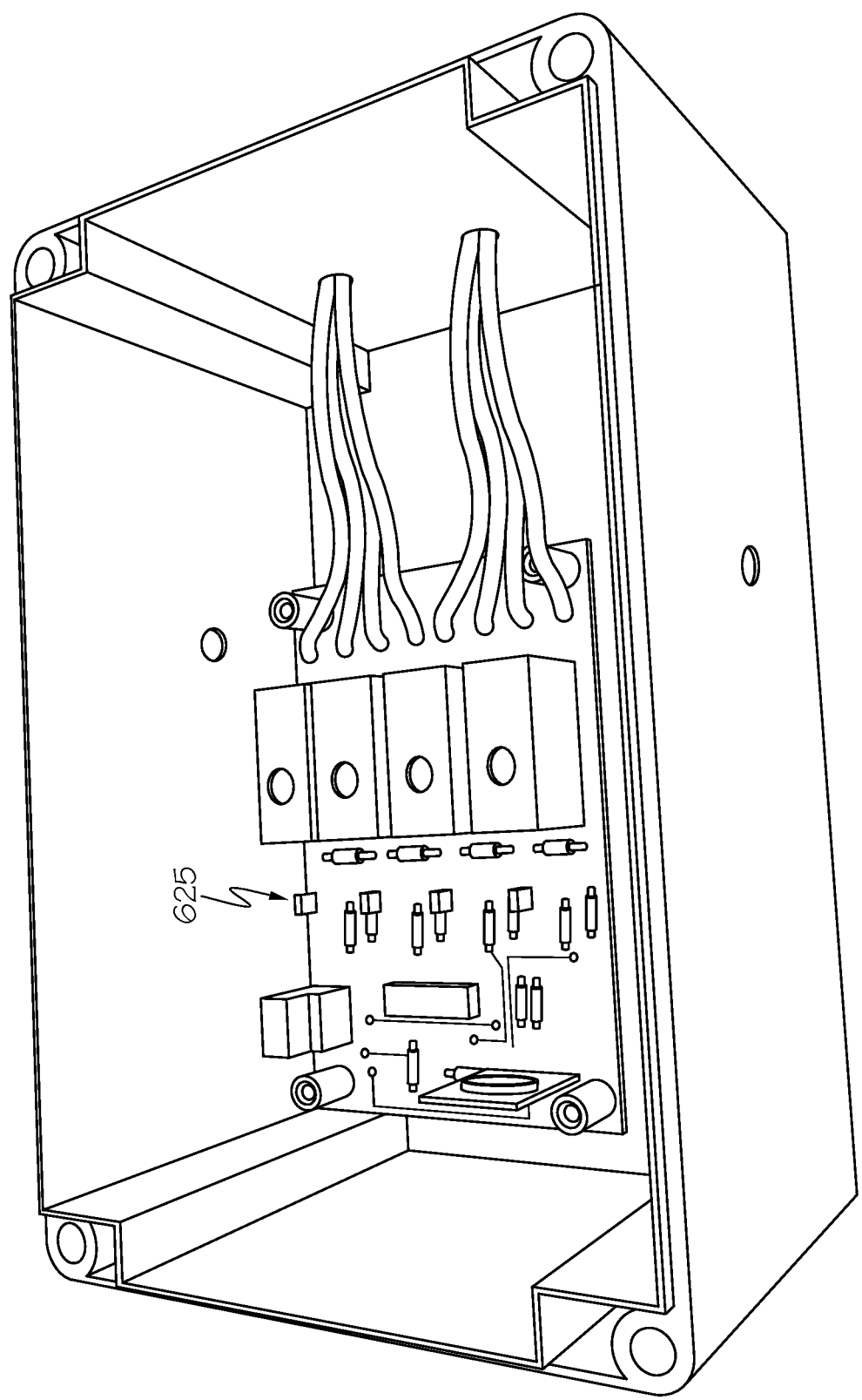
FIG. 16 depicts a top perspective view of an exemplary sequencer with a portion of the housing removed.
Figure 17:
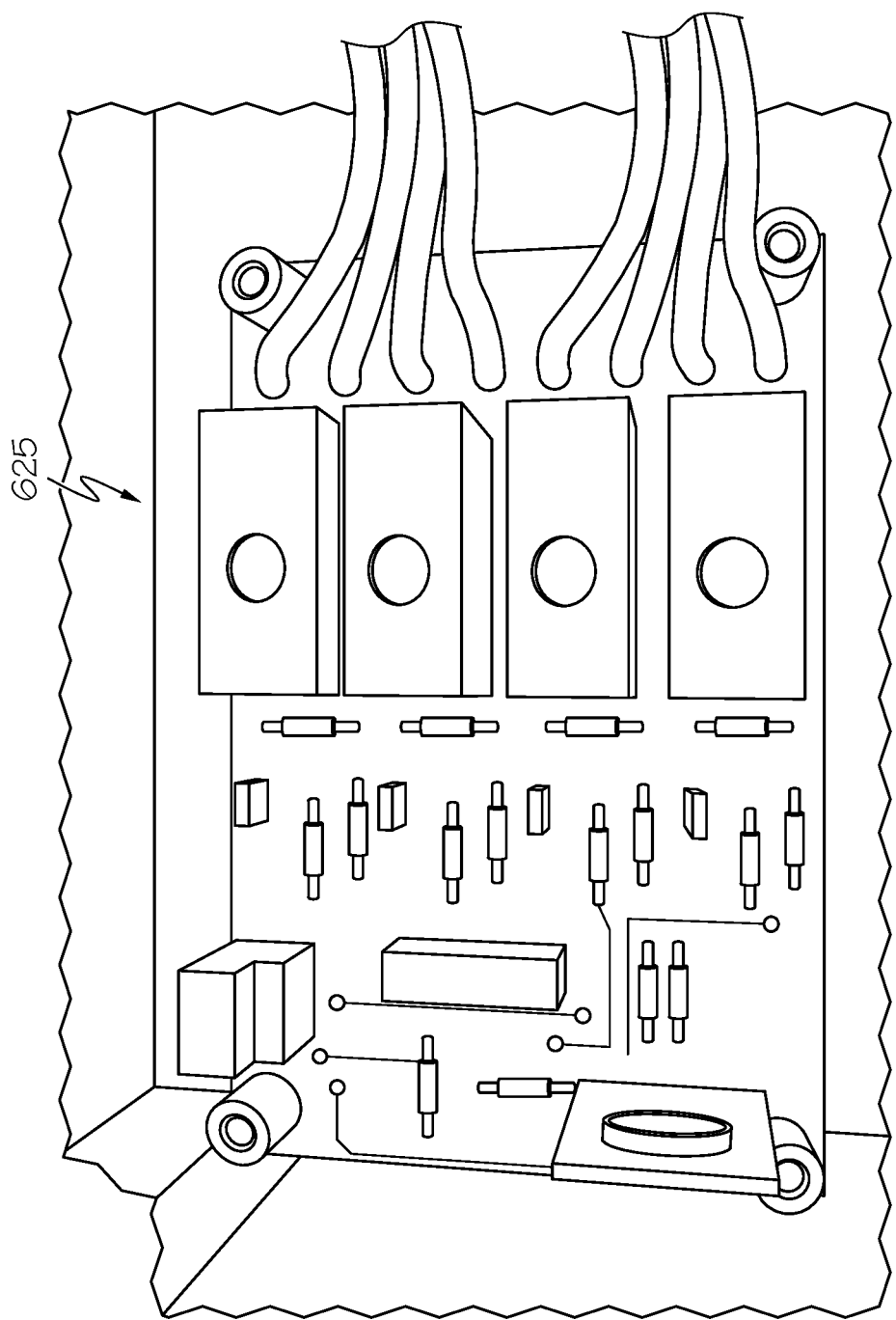
FIG. 17 depicts a top view of an exemplary circuit board of the sequencer of FIG. 16.

A sequencer is a device configured to facilitate charging and/or discharging of multiple batteries. The sequencer can be a separate add-on component or an integral portion of a battery maintenance device. Once the first battery is charged then the sequencer allows the battery maintenance device to charge the next battery and so on. One embodiment of a sequencer is shown in FIGS. 16 and 17 and indicated as sequencer (625). The embodiment shown in FIGS. 16 and 17 has a portion of the housing of sequencer (625) removed. The illustrated embodiment shown in FIGS. 16 and 17 is a component that is separate from the battery maintenance device (e.g., standalone recharging device (300), battery exercising device (1, 301, 501, 601), etc.). Sequencer (625) can comprise one or more relays, one or more relay controls, a power supply, and a processing component, such as one or more of a microcontroller, including but not limited to a PIC microcontroller or other similar circuit, a microprocessor, or other similar processing devices configured to receive inputs. The processing component may include a CPU programmed to make decisions regarding what to do when it receives inputs.

The use of sequencer (625) when charging multiple batteries consecutively can allow the use of the discharge energy of a battery being discharged to be transferred to another battery with lower energy down the line. Sequencer (625) can also allow for energy to be transferred from a battery of higher energy to a battery of lower energy. Sequencer (625) may be able to communicate with the battery maintenance device via wired and/or wireless connection. The wireless connection may utilize any suitable wireless communication technology, including but not limited to Bluetooth or Wi-Fi technology. In some embodiments, sequencer (625) may be configured to control operation of one or more associated battery maintenance devices when sequencer (625) is operating, resulting in a master/slave relationship where sequencer (625) is the master and the associated battery maintenance devices are the slaves.

Sequencer (625) may be configured to sequentially charge a plurality of batteries electrically connected to the battery maintenance device. In systems where the battery maintenance device has discharging capabilities, such as if a battery exercising device, such as battery exercising device (1, 301, 501, 601), is included, sequencer (625) may also control discharging of the plurality of batteries via the battery exercising device. Sequencer (625) may determine which battery to charge or discharge based on programming or an algorithm or logic stored in the processing component or otherwise available to the CPU. Based on that programming or algorithm or logic, the CPU may determine which relay to turn on in order to charge or discharge the appropriate battery. Some embodiments of sequencer (625) may be configured to charge or discharge one battery at a time, while other embodiments may be configured to charge or discharge more than one battery simultaneously.

Information regarding all processes involving sequencer (625) and/or the battery maintenance device could be provided to the user via a feedback mechanism, such as feedback mechanism (37) described previously. The feedback mechanism can be incorporated into the battery maintenance device or sequencer (625). In still other embodiments, the feedback mechanism may be an external device that is in communication with one or more of the battery maintenance device and sequencer (625), such as a smartphone, tablet, computer, or any other suitable external feedback mechanism. In such an embodiment, the external feedback mechanism may be in communication with one or more of the battery maintenance device and sequencer (625) via a wired or wireless connection. The wireless connection may utilize any suitable wireless communications technology, including but not limited to Bluetooth or Wi-Fi technology.

In addition to the above description of lighted connector (605), the feedback mechanism may comprise a light, including but not limited to an LED light, connected to a control unit and/or processing component, such as control unit (23) and/or processing component (24) described herein, by way of a light circuit. In some embodiments where the feedback mechanism comprises a light, the control unit and/or processing component may be programmed to actuate the feedback mechanism to illuminate in a first color when an electrically connected rechargeable battery, such as battery (9), is being charged (e.g., when the battery maintenance device is in charge mode) and illuminate in a second color when the rechargeable battery is being discharged (e.g., when the battery maintenance device is in discharge mode). In some embodiments of a battery maintenance device, additional colors, flashing patterns, or other indicia may be provided via the feedback mechanism for indicating the state of the charging and/or discharging. For example, a set of three out of five rectangular shaped bars may be illuminated to indicate the charge cycle is three-fifths complete. In other embodiments, the feedback mechanism may comprise a display screen for providing feedback information to the user, including but not limited to alphanumeric messages or error codes. In other embodiments, the feedback mechanism may comprise a device or speaker for emitting an audible tone, beep or other sound for providing feedback information to the user, such as piezo indicator (627) shown in FIG. 18. In some embodiments, the battery maintenance device or sequencer (625) may include more than one feedback mechanism, including but not limited to two or more lights, two or more speakers, or a combination of two or more lights, speakers, and displays.

In some embodiments, during the charging mode, the battery maintenance device may use a constant current method to charge an electrically connected rechargeable battery, such as the method described above. In these embodiments, the battery maintenance device may include components configured to allow the battery maintenance device to utilize a constant current method, including but not limited to a linear regulator. In other embodiments, the battery maintenance device may use a constant power method to charge an electrically connected rechargeable battery. When using the constant power method, the battery maintenance device may produce an inverse relationship between current (i.e., amps) and voltage. In other words, when the battery maintenance device utilizes a constant power method to maintain a battery, as the charging current increases, the voltage decreases, thereby keeping the wattage or power of the electricity being provided to the battery constant. This is contrasted with the constant current method described above, wherein the battery maintenance device provides electricity to a battery at a constant current until a predetermined voltage level is reached. During a constant current method, the battery maintenance device can provide electricity at a higher current and power than is desirable for the given size of the connected battery, particularly if the battery is a small amp hour battery. Depending on the size of the battery connected to the battery maintenance device, the use of a constant current method can result in overcharging and/or overheating of the battery in some instances, because the power and current of the electricity being provided to the battery can be too high. The constant power method may allow for a good charge without overpowering or overstressing the battery no matter what size battery is attached to the battery maintenance device. In these constant power embodiments, the battery maintenance device may include components configured to allow the battery maintenance device to utilize a constant power method, including but not limited to one or more current limiting resistors, such as current limiting resistors (629) shown in FIGS. 14, 15, and 18.

Figure 14:
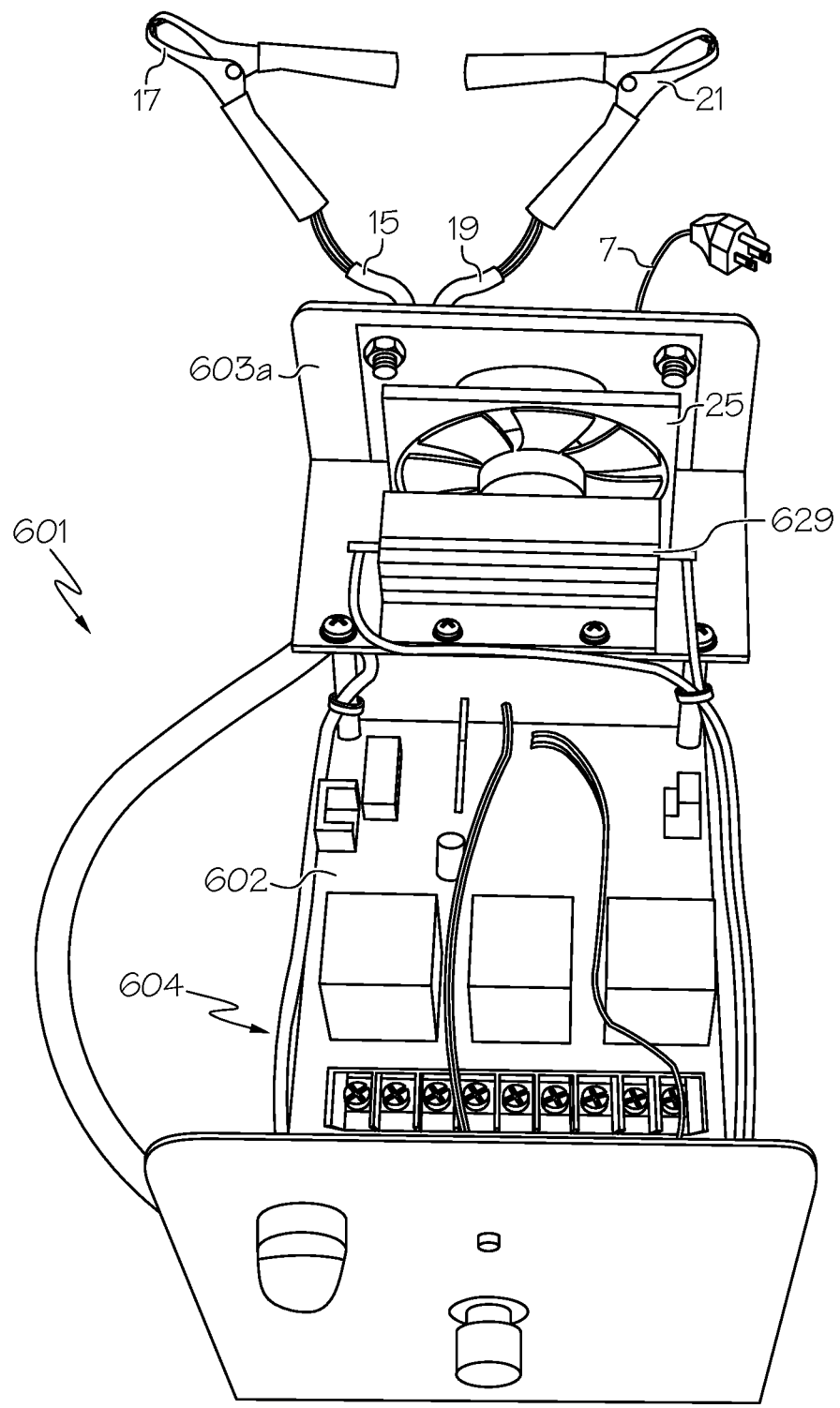
FIG. 14 depicts a front perspective view of the battery exercising device of FIG. 12 with a portion of the housing removed.
Figure 15:
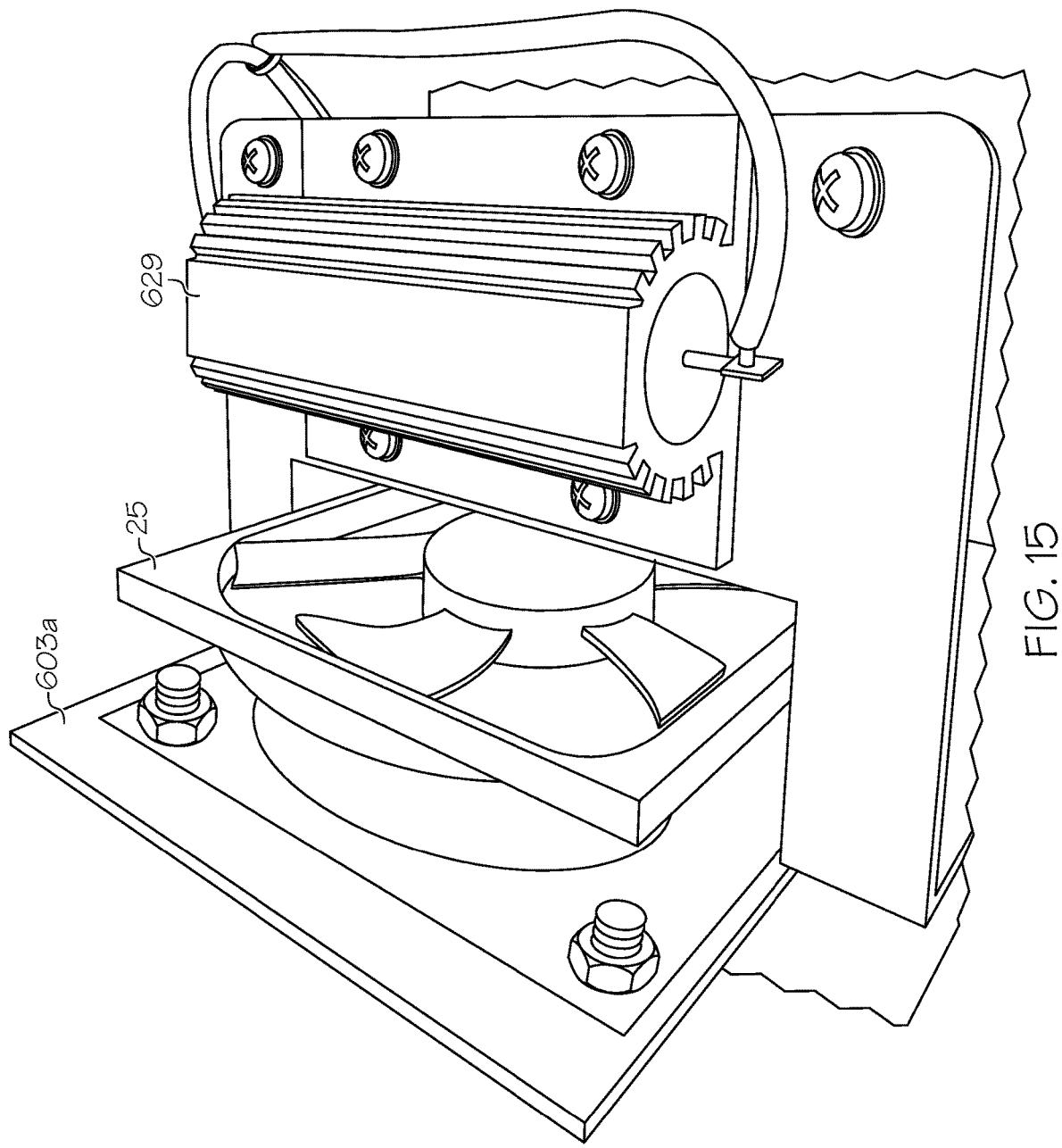
FIG. 15 depicts a close-up view of an exemplary current limiting resistor of the battery exercising device of FIG. 12.

In the embodiment shown in FIGS. 14 and 15, the current limiting resistor (629) is cantilevered from the front wall (603a) of the housing (603) of battery exercising device (601). Specifically, current limiting resistor (629) is attached to the front wall (603a) of the housing (603) such that current limiting resistor (629) is suspended above (i.e., vertically spaced above) the circuit board (602), which in turn is suspended above the power supply (604). This configuration may provide improved heat dissipation and reduce the amount of heat transferred through the housing of battery exercising device (601).

In some embodiments, the battery maintenance device may include two sets of components. A first set of components configured to allow the battery maintenance device to utilize a constant current method and a second set of components configured to allow the battery maintenance device to utilize a constant power method. In these embodiments, the battery maintenance device may include an input mechanism, such as input mechanism (45) described above, configured to allow the battery maintenance device to transition between a constant current mode, wherein the battery maintenance device uses a constant current method to charge the battery and a constant power mode, wherein the battery maintenance device uses a constant power method to charge the battery.

In some embodiments, the battery maintenance device may use the hysteresis charge method when it is in storage mode that disconnects the float current when the battery maintenance device goes to wait mode. The hysteresis charge method may eliminate the need for trickle and/or float chargers which can plug plate pores and result in voltage drop. However, when the battery maintenance device is in storage mode, it may only apply a toppingcharge to replenish lost energy due to self-discharge, or when a load is applied. This can be beneficial when maintaining a battery in storage when there is drain (energy loss or load) on the battery, such as an auto security system. For example, if the battery voltage drops below a preset voltage, such as 12.5 volts (possibly due to self-discharge or due to an exterior drain, such as a security system, lights, radio, etc.) and then the battery maintenance device may charge the battery to a preset voltage, such as 14.7 volts with or without a saturation charge. Nevertheless, if desired, a trickle charge can be used.

In some embodiments, the battery maintenance device and/or sequencer (625) can be programmed and/or activated via wireless communication with an input mechanism. This could be used to allow the battery maintenance device and sequencer (625) to turn on in between cycles and refresh batteries. The wireless connection may utilize any suitable wireless communication technology, including but not limited to Bluetooth technology.

Figure 18:
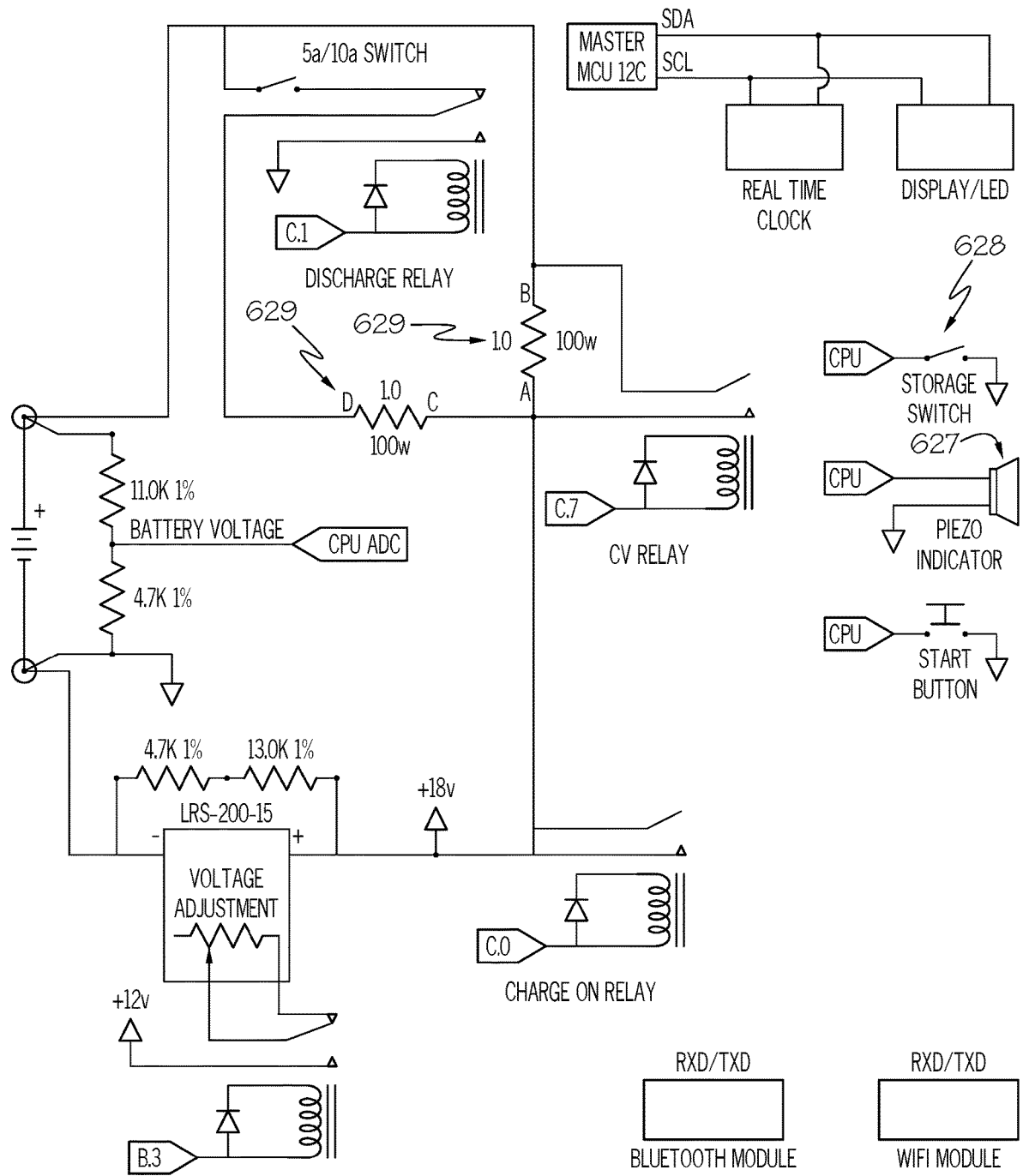
FIG. 18 is a block diagram depicting an exemplary embodiment of power wiring that could be incorporated into a battery maintenance device, such as the battery exercising device of FIG. 12.

FIG. 18 is a block diagram depicting an embodiment of power wiring that could be incorporated into a battery maintenance device, including but not limited to standalone recharging device (300) and battery exercising device (1, 301, 501, 601) described herein. The power wiring depicted in FIG. 18 may be associated with the high current controls in the battery maintenance device. The high current controls may comprise electronic components are configured to control the charging of the battery by the battery maintenance device, and may include the components of a charging circuit, such as charge circuit (43) described above. The high current controls may be components that are configured to use a relatively large amount of current, such as up to about 14 amps for example, as opposed to low current controls, such as a CPU, switches, relays, etc. that use a relatively small amount of current.

XI. EXEMPLARY COMBINATIONS

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A system comprising: (a) a battery connector, wherein the battery connector comprises a light; and (b) a processing component, wherein the processing component is in communication with the light, wherein the processing component is programmed to illuminate the light in response to an illumination trigger being detected by the processing component, wherein the processing component is further programmed to turn off the light in response to a shut-off trigger being detected by the processing component.

Example 2

The system of Example 1 or the system of any of the following Examples, wherein the battery connector comprises a first clamp arm and a second clamp arm, wherein the light is positioned between the first clamp arm and the second clamp arm.

Example 3

The system of any of the preceding or following Examples, wherein the battery connector further comprises a first handle associated with the first clamp arm and a second handle associated with the second clamp arm.

Example 4

The system of any of the preceding or following Examples, wherein the battery connector further comprises a hinge pin, wherein the first handle and the second handle are rotatable about the hinge pin.

Example 5

The system of any of the preceding or following Examples, wherein the battery connector further comprises a biasing member positioned between the first clamp arm and the second clamp arm.

Example 6

The system of any of the preceding or following Examples, wherein the processing component is further programmed to cause the light to flash in a predetermined pattern in response to the illumination trigger being detected by the processing component.

Example 7

The system of any of the preceding or following Examples, wherein the light comprises an LED light.

Example 8

The system of any of the preceding or following Examples, wherein the illumination trigger is caused by the battery connector transitioning from a closed position toward an open position.

Example 9

The system of any of the preceding or following Examples, wherein the shut-off trigger is caused by the battery connector being attached to a terminal of a battery.

Example 10

A system comprising: (a) a battery connector, wherein the battery connector comprises a light; (b) a battery maintenance device, wherein the battery connector is associated with the battery maintenance device via a wire; and (c) a control unit comprising a processing component, wherein the control unit is in communication with the light, wherein the control unit is programmed to illuminate the light in response to an illumination trigger being detected by the control unit, wherein the control unit is further programmed to turn off the light in response to a shut-off trigger being detected by the control unit.

Example 11

The system of any of the preceding or following Examples, wherein the battery maintenance device comprises a housing and the control unit is positioned within the housing of the battery maintenance device.

Example 12

The system of any of the preceding or following Examples, wherein the battery maintenance device comprises a battery exercising device.

Example 13

The system of any of the preceding or following Examples, wherein the battery exercising device comprises a discharge circuit operable to allow the battery exercising device to selectively discharge a rechargeable battery.

Example 14

The system of any of the preceding or following Examples, wherein the battery exercising device further comprises a charge circuit operable to allow the battery exercising device to selectively charge a rechargeable battery.

Example 15

The system of any of the preceding or following Examples, wherein the battery maintenance device comprises a standalone recharging device.

Example 16

The system of any of the preceding or following Examples, wherein the illumination trigger is caused by the battery maintenance device being turned on.

Example 17

The system of any of the preceding or following Examples, wherein the system further comprises a second battery connector, wherein the second battery connector comprises a second light, wherein the second battery connector is associated with the battery maintenance device via a second wire, wherein the control unit is in communication with the second light, wherein the control unit is programmed to illuminate the second light in response to the illumination trigger being detected by the control unit, wherein the control unit is further programmed to turn off the second light in response to the shut-off trigger being detected by the control unit.

Example 18

The system of any of the preceding or following Examples, wherein the shut-off trigger is caused by the second battery connector being attached to a second terminal of a battery while the battery connector is concurrently attached to a first terminal of the battery.

Example 19

A system comprising: (a) a battery connector, wherein the battery connector comprises a light; and (b) a light power source, wherein the light receives power from the light power source, wherein the light power source is located externally to the battery connector.

Example 20

The system of any of the preceding or following Examples, wherein the light power source provides substantially continuous power.

XII. MISCELLANEOUS

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A system comprising:
   (a) a battery connector, wherein the battery connector comprises a light; and
   (b) a processing component, wherein the processing component is in communication with the light, wherein the processing component is programmed to illuminate the light in response to an illumination trigger being detected by the processing component, wherein the processing component is further programmed to turn off the light in response to a shut-off trigger being detected by the processing component.

2. The system of claim 1, wherein the battery connector comprises a first clamp arm and a second clamp arm, wherein the light is positioned between the first clamp arm and the second clamp arm.

3. The system of claim 2, wherein the battery connector further comprises a first handle associated with the first clamp arm and a second handle associated with the second clamp arm.

4. The system of claim 3, wherein the battery connector further comprises a hinge pin, wherein the first handle and the second handle are rotatable about the hinge pin.

5. The system of claim 4, wherein the battery connector further comprises a biasing member positioned between the first clamp arm and the second clamp arm.

6. The system of claim 1, wherein the processing component is further programmed to cause the light to flash in a predetermined pattern in response to the illumination trigger being detected by the processing component.

7. The system of claim 1, wherein the light comprises an LED light.

8. The system of claim 1, wherein the illumination trigger is caused by the battery connector transitioning from a closed position toward an open position.

9. The system of claim 1, wherein the shut-off trigger is caused by the battery connector being attached to a terminal of a battery.

10. A system comprising:
    (a) a battery connector, wherein the battery connector comprises a light;
    (b) a battery maintenance device, wherein the battery connector is associated with the battery maintenance device via a wire; and
    (c) a control unit comprising a processing component, wherein the control unit is in communication with the light, wherein the control unit is programmed to illuminate the light in response to an illumination trigger being detected by the control unit, wherein the control unit is further programmed to turn off the light in response to a shut-off trigger being detected by the control unit.

11. The system of claim 10, wherein the battery maintenance device comprises a housing, wherein the control unit is positioned within the housing of the battery maintenance device.

12. The system of claim 10, wherein the battery maintenance device comprises a battery exercising device.

13. The system of claim 12, wherein the battery exercising device comprises a discharge circuit operable to allow the battery exercising device to selectively discharge a rechargeable battery.

14. The system of claim 13, wherein the battery exercising device further comprises a charge circuit operable to allow the battery exercising device to selectively charge a rechargeable battery.

15. The system of claim 10, wherein the battery maintenance device comprises a standalone recharging device.

16. The system of claim 10, wherein the illumination trigger is caused by the battery maintenance device being turned on.

17. The system of claim 10, wherein the system further comprises a second battery connector, wherein the second battery connector comprises a second light, wherein the second battery connector is associated with the battery maintenance device via a second wire, wherein the control unit is in communication with the second light, wherein the control unit is programmed to illuminate the second light in response to the illumination trigger being detected by the control unit, wherein the control unit is further programmed to turn off the second light in response to the shut-off trigger being detected by the control unit.

18. The system of claim 17, wherein the shut-off trigger is caused by the second battery connector being attached to a second terminal of a battery while the battery connector is concurrently attached to a first terminal of the battery.

* * * * *